(12) United States Patent
Kano

(10) Patent No.: US 9,094,347 B2
(45) Date of Patent: Jul. 28, 2015

(54) APPARATUS AND METHOD FOR TRANSFERRING PACKETS

(71) Applicant: FUJITSU LIMITED, Kawasaki-shi, Kanagawa (JP)

(72) Inventor: Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 13/909,449

(22) Filed: Jun. 4, 2013

(65) Prior Publication Data

US 2014/0016635 A1    Jan. 16, 2014

(30) Foreign Application Priority Data

Jul. 10, 2012    (JP) ................................. 2012-154573

(51) Int. Cl.
*H04L 12/721* (2013.01)
*H04W 8/08* (2009.01)
*H04W 80/04* (2009.01)

(52) U.S. Cl.
CPC ................ *H04L 45/72* (2013.01); *H04W 8/08* (2013.01); *H04W 80/04* (2013.01)

(58) Field of Classification Search
None
See application file for complete search history.

(56) References Cited

U.S. PATENT DOCUMENTS

| 2006/0218262 | A1* | 9/2006 | Abeta et al. | 709/223 |
| 2007/0091793 | A1* | 4/2007 | Filsfils et al. | 370/228 |
| 2009/0052316 | A1 | 2/2009 | Aso et al. | |
| 2011/0261800 | A1* | 10/2011 | You et al. | 370/338 |
| 2014/0016635 | A1* | 1/2014 | Kano | 370/389 |

FOREIGN PATENT DOCUMENTS

WO    WO 2006/104202    10/2006

OTHER PUBLICATIONS

Farinacci, et al., "Locator/ID Separation Protocol (LISP), draft-ietf-lisp-22" IETF Trust, (Feb. 12, 2012) pp. 1-97.

* cited by examiner

*Primary Examiner* — Benjamin H Elliott, IV
(74) *Attorney, Agent, or Firm* — Staas & Halsey LLP

(57) ABSTRACT

When a first transfer-device in a first network receives, from a first communication-device in the first network, a packet addressed to a second communication-device in a second network, the first transfer-device requests a location management server to provide first information identifying a second transfer-device that is included in the second network and operable to transfer the packet to the second communication-device. The location management server notifies at least one of transfer-devices in the first network of the first information. After the transfer-devices in the first network have been notified of second information identifying a third transfer-device that is included in the first network and coupled to the second transfer-device via a route whose state is relatively favorable, the third transfer-device transfers the packet to the second transfer-device via a communication tunnel coupling the third transfer-device with the second transfer-device.

12 Claims, 24 Drawing Sheets

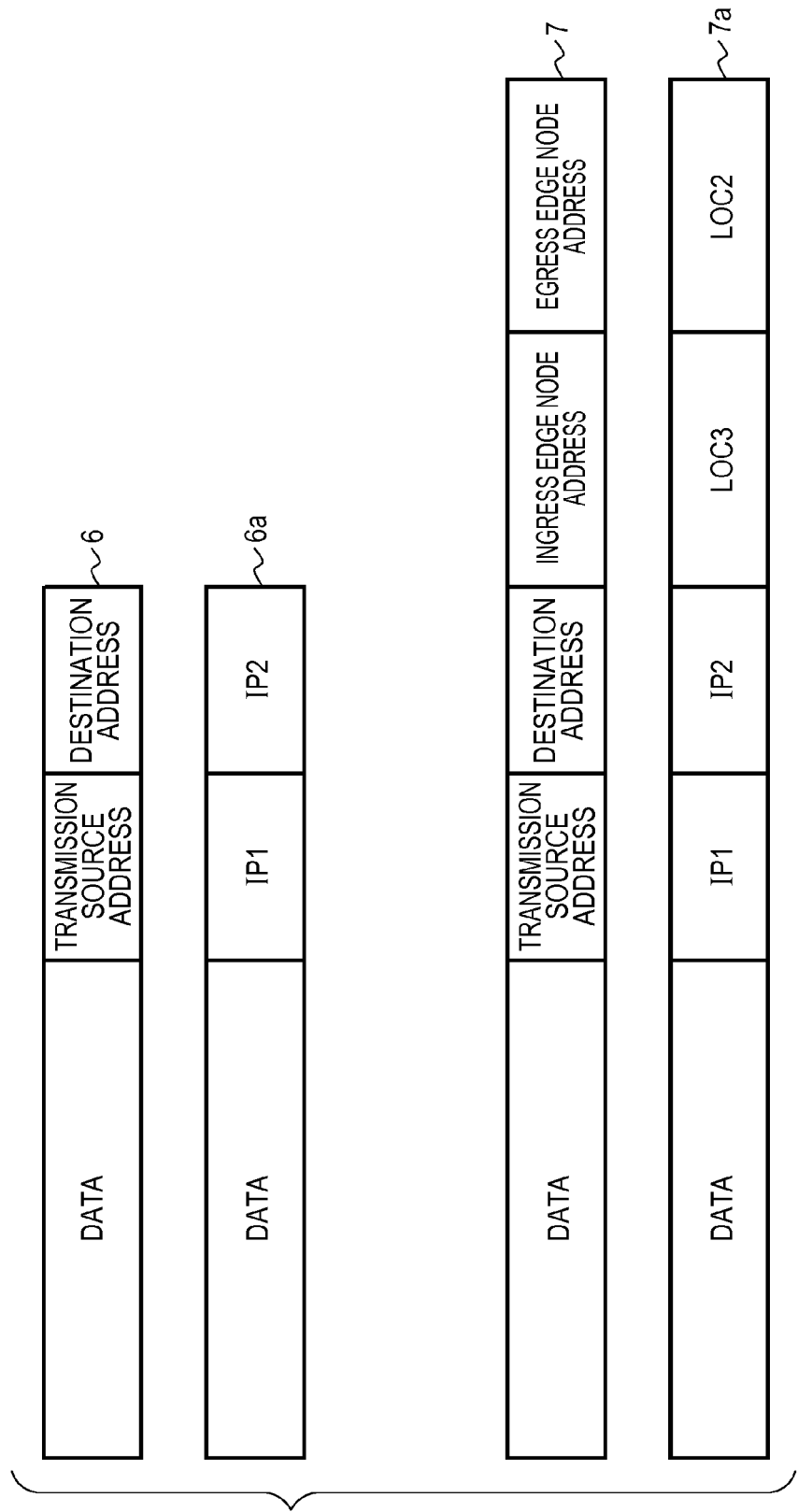

FIG. 5

| ALL OSPF ROUTER MULTICASTS (224.0.0.5) |
|---|
| TRANSMISSION SOURCE ADDRESS |
| Protocol ID = OSPF |
| Message Type = LS update |
| LS Type = AS – External LSA |
| DESTINATION NETWORK ADDRESS |
| DISTANCE |

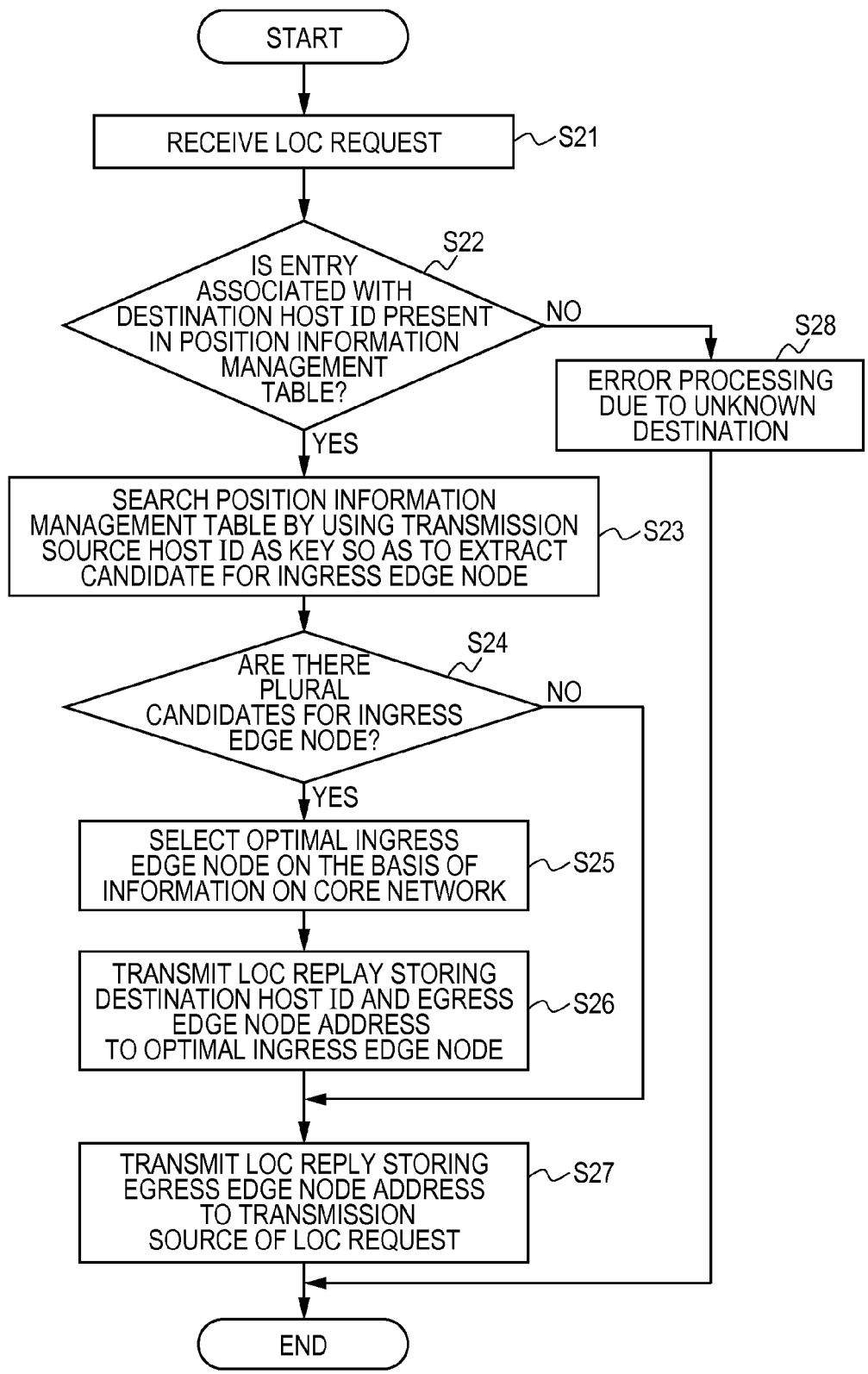

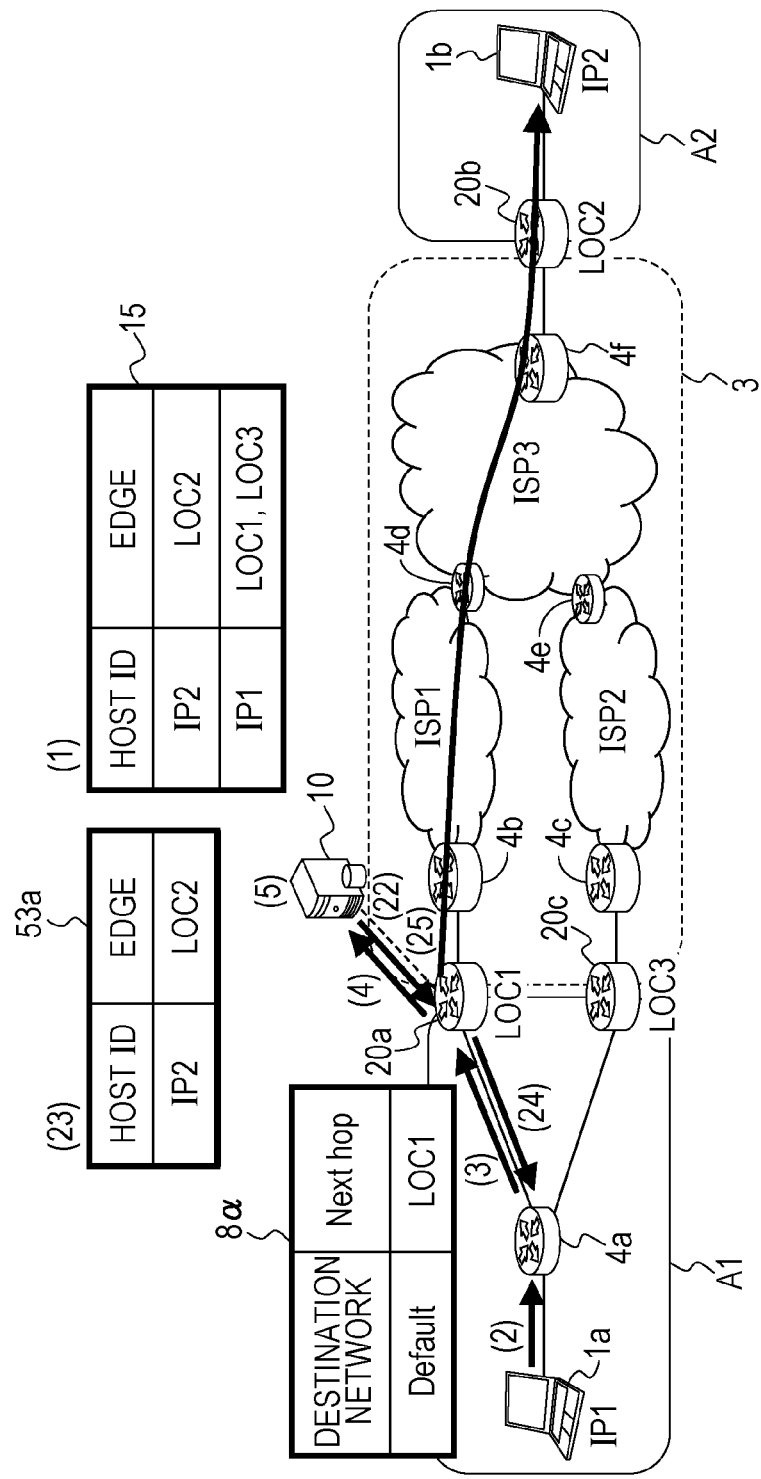

APPARATUS AND METHOD FOR TRANSFERRING PACKETS

CROSS-REFERENCE TO RELATED APPLICATION

This application is based upon and claims the benefit of priority of the prior Japanese Patent Application No. 2012-154573, filed on Jul. 10, 2012, the entire contents of which are incorporated herein by reference.

FIELD

The embodiments discussed herein are related to an apparatus and method for transferring packets.

BACKGROUND

The number of routes which are stored in a router is increased along with increase of the number of communication devices which are included in a communication network. Therefore, an ID-Locator separation technique has attracted attention in recent years as a technique for avoiding increase in the amount of route information which is held by a router. Locator identifier separation protocol (LISP) is known as one of ID-Locator separation techniques.

FIG. 1 is a diagram illustrating an example of a network to which a LISP is applied. A network employing the LISP includes access networks A1, A2, a core network 3, and a location management server 10. The core network and the access networks are connected with each other by routers. Hereinafter, a router which belongs to both of a core network and an access network is referred to as an "edge node", and a location address assigned to an edge node is abbreviated as a "LOC". In the example of FIG. 1, the access network A1 and the core network 3 are connected with each other via an edge node 2a, and the access network A2 and the core network 3 are connected with each other via an edge node 2b. Further, in the example of FIG. 1, it is assumed that a router 4 is included in the access network A1 and a communication device 1a transmits a packet addressed to the core network 3 or the access network A2, to the edge node 2a via the router 4.

The location management server 10 acquires ID-LOC correspondence information from each edge node and holds the ID-LOC correspondence information in a position information management table 15. Here, ID-LOC correspondence information is a combination of an address (host ID) assigned to a communication device included in an access network in which an edge node is included and an address of the edge node. For example, the position information management table 15 depicted in FIG. 1 is generated when a host ID of the communication device 1a is IP1, a host ID of the communication device 1b is IP2, an address of the edge node 2a is LOC1, and an address of the edge node 2b is LOC2. Communication among communication devices belonging to different access networks is performed using ID-LOC correspondence information.

For example, a case where the communication device 1a transmits a packet 6 to the communication device 1b is described. The edge node 2a requests ID-LOC correspondence information including the host ID (IP2) of the communication device 1b which is a destination, from the location management server 10 (transmission of a LOC request message). The location management server 10 refers to the position information management table 15 so as to determine that an address associated with IP2 is LOC2. Further, the location management server 10 notifies the edge node 2a that an address assigned to the edge node of the access network to which IP2 belongs is LOC2, by using a LOC reply message. The edge node 2a stores the notified ID-LOC correspondence information in a LOC cache table 5. The edge node 2a generate an encapsulated packet 7 by encapsulating the packet 6 using a header (outer header) whose destination address is the address of the edge node notified from the location management server. The encapsulated packet 7 is routed to the edge node 2b by the outer header. The edge node 2b decapsulates the encapsulated packet 7 and transfers the packet 6 to the communication device 1b. Thereafter, upon receiving a packet addressed to the communication device 1b from the communication device 1a, the edge node 2a transfers the packet by using the information stored in the LOC cache table 5.

As the related art, such technique is known that when a mobile node transmits a packet to a node serving as a communication destination via a home agent, the mobile node transmits a packet 6 to the home agent by encapsulating the packet 6 addressed to the node serving as the communication destination. Here, there is a case where plural home addresses are assigned to a mobile node. In this case, the home agent is configured to detect a communication state of an internet service provider, and select an address to be set as a transmission source address of the packet 6 included in the encapsulated packet 7 based on the detected communication state.

International Publication Pamphlet No. WO 2006/104202 is an example of related art. Locator/ID Separation Protocol (LISP), draft-ietf-lisp-22.txt (Feb. 12, 2012) is an example of related art.

SUMMARY

According to an aspect of the embodiments, when a first transfer device in a first network receives a packet addressed to a second communication device in a second network from a first communication device in the first network, the first transfer device requests a location management server to provide first information identifying a second transfer device that is included in the second network and operable to transfer the packet to the second communication device, where the location management server manages positions of the first and second communication devices. The location management server notifies at least one of transfer devices in the first network of the first information. After the transfer devices in the first network have been notified of second information identifying a third transfer device that is included in the first network and coupled to the second transfer device via a route whose state is relatively favorable among the transfer devices in the first network, the third transfer device transfers the packet to the second transfer device via a communication tunnel coupling the third transfer device with the second transfer device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating examples of formats of a packet and an encapsulated packet, according to an embodiment;

FIG. 5 is a diagram illustrating an example of a LOC information notification message, according to an embodiment;

FIG. 13 is a diagram illustrating an example of an operational flowchart performed by a location management server, according to a first embodiment;

FIGS. 14A and 14B are diagrams illustrating an example of a communication method, according to a second embodiment;

DESCRIPTION OF EMBODIMENTS

It is preferable for a communication device which is included in a certain access network to communicate with a communication device included in another access network even if a failure occurs in a device or an edge node belonging to a core network. For this purpose, it is required that an access network is connected to a plurality of ISPs included in a core network via edge nodes which are different from each other for respective ISPs.

However, in a network to which a LISP is applied, an edge node has not acquired yet, from the location management server 10, information on a destination edge node to which an encapsulated packet is to be transmitted, except for destination edge nodes to which the edge node transmitted a packet previously. Therefore, when a plurality of edge nodes are used to set a redundant route, the router 4 in an access network on a source side is unable to identify an edge node to which a data packet is to be transmitted, failing to transfer the data packet. To address this problem, it is conceivable that information on edge nodes to be transfer destinations are preliminarily set in the router 4 in an access network, and when a failure occurs in one of the transfer destination edge nodes, transfer is performed with respect to another one of the transfer destination edge nodes. However, in such designing, it is difficult to avoid a failure when the failure occurs in an edge node of an ISP to which a transfer destination edge node is connected, or when the failure occurs inside the ISP.

It is also conceivable that a router included in an access network holds information on routes to respective communication devices included in relevant networks in order to make communication possible even when a failure occurs in any one of the relevant networks. However, this case brings such problem that the number of routes whose information is to be stored in the router becomes enormous.

Figure 1:
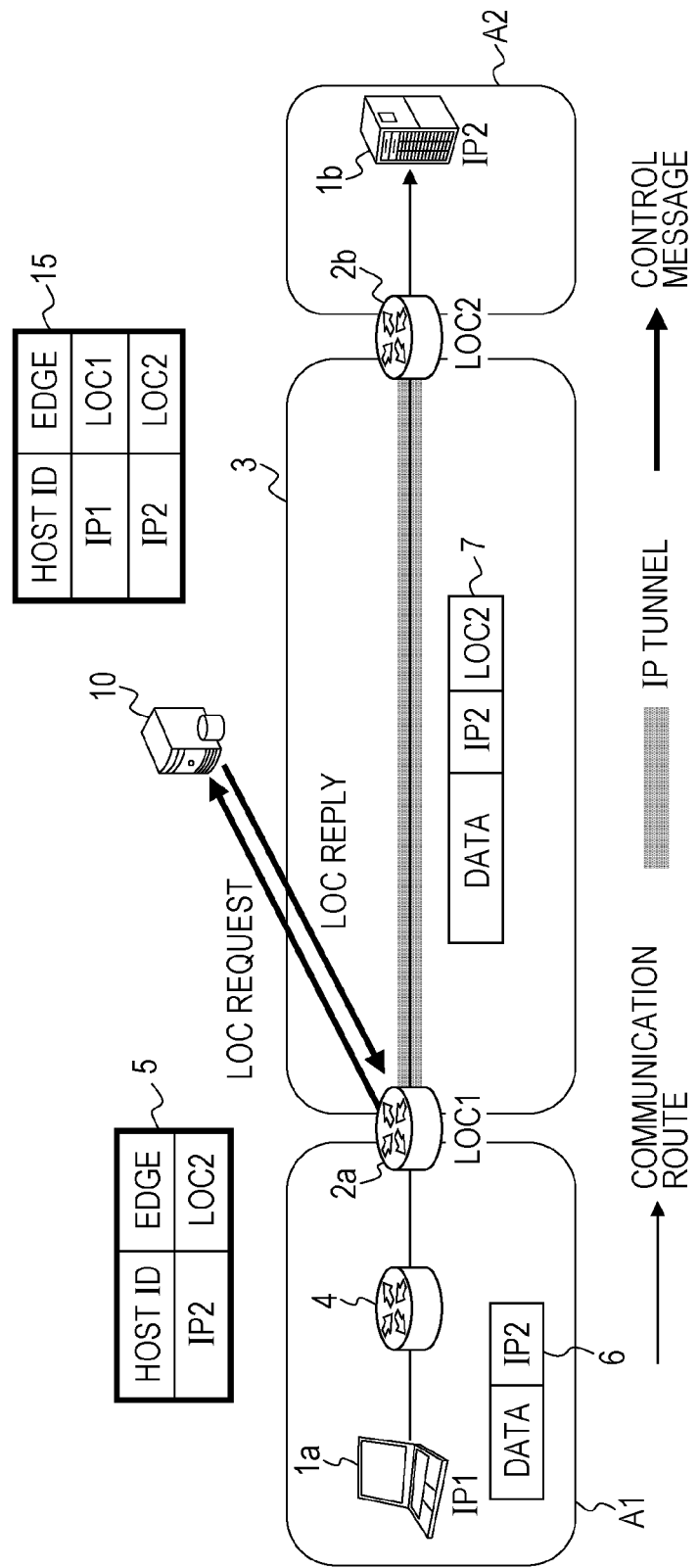
FIG. 1 is a diagram illustrating an example of a communication network to which a Locator identifier separation protocol (LISP) is applied.
Figure 2:
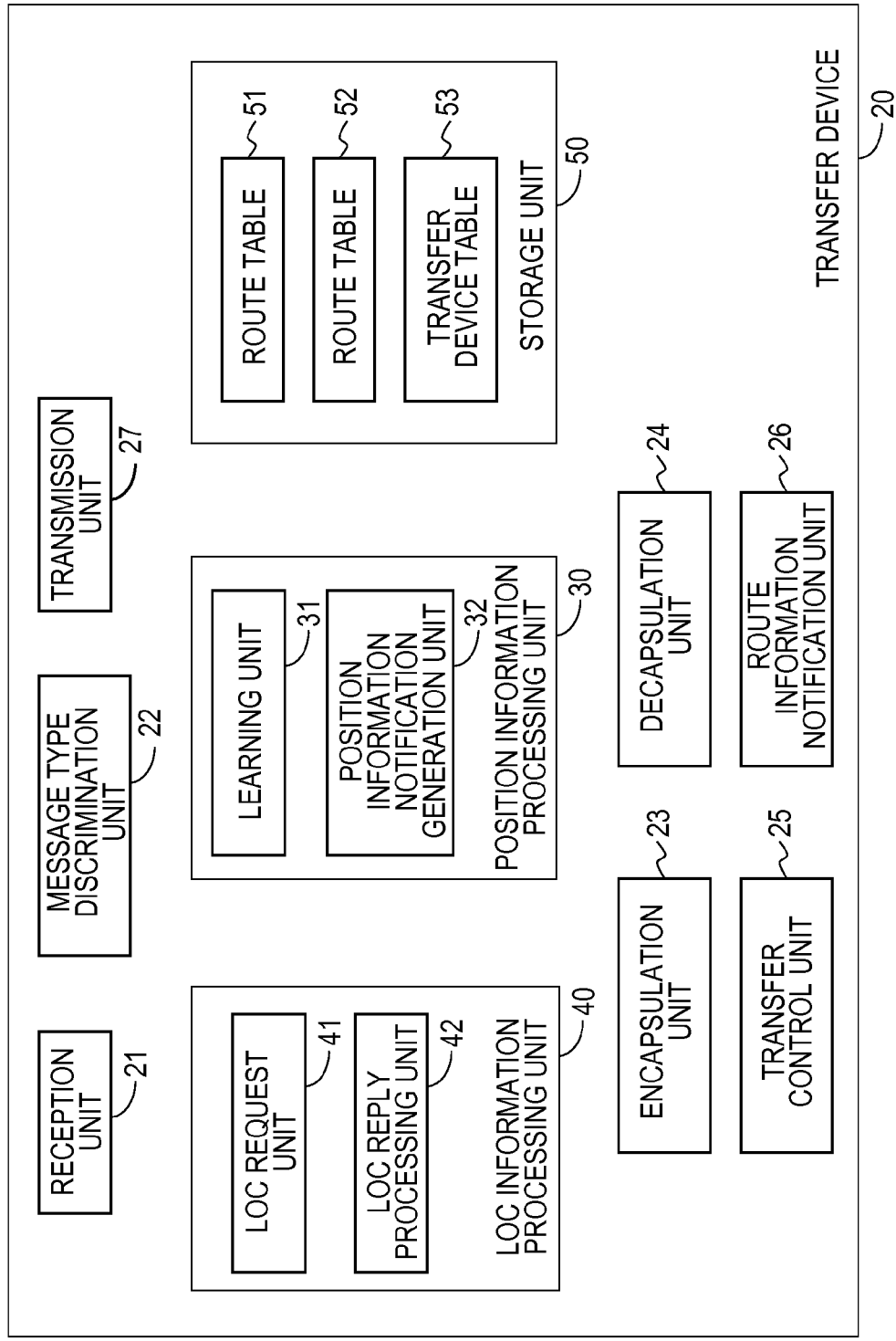
FIG. 2 is a diagram illustrating a configuration example of a transfer device, according to an embodiment.

FIG. 2 is a diagram illustrating a configuration example of a transfer device, according to an embodiment. The transfer device 20 includes a reception unit 21, a message type discrimination unit 22, an encapsulation unit 23, a decapsulation unit 24, a transfer control unit 25, a route information notification unit 26, a transmission unit 27, a position information processing unit 30, a LOC information processing unit 40, and a storage unit 50. The position information processing unit 30 includes a learning unit 31 and a position information notification generation unit 32. The LOC information processing unit 40 includes a LOC request unit 41 and a LOC reply processing unit 42. The storage unit 50 stores a route table 51, a route table 52, and a transfer device table 53.

The transfer device 20 stores, in the route table 51, information on a route reaching the communication device 1 in an access network including the transfer device 20. On the other hand, the route table 52 stores information on routes along which packets are transferable among communication devices 1 and transfer devices 20 via the core network 3.

In the case where a tunnel communication of the encapsulated packet 7 is performed to transmit the packet 6, the transfer device table 53 records information for associating a transfer device 20 serving as an end point of a communication tunnel with a communication device 1 serving as a destination is recorded. Hereinafter, a transfer device 20 serving as an end point of the communication tunnel will be also referred to as an "egress edge node". An egress edge node is a transfer device 20 that is accessible from a communication device 1 serving as a destination of the packet 6. Further, a transfer device 20 serving as a start point of the communication tunnel will be also referred to as an "ingress edge node". It is assumed that an ingress edge node is selected from among transfer devices 20 that are accessible from a communication device 1 serving as a transmission source of the packet 6. The transfer device table 53 is generated on the basis of information recorded in a LOC reply message. In the transfer device table 53, a combination of an address of the communication device 1 serving as a destination of the packet 6 and an address of an egress edge node is recorded. Here, a LOC reply message is transmitted from the location management server 10 to the transfer device 20 as a reply to the LOC request message. Here, a LOC request message is a control message that is transmitted from a transfer device 20 when the transfer device 20 inquires information on an egress edge node from the location management server 10.

Figure 3A:
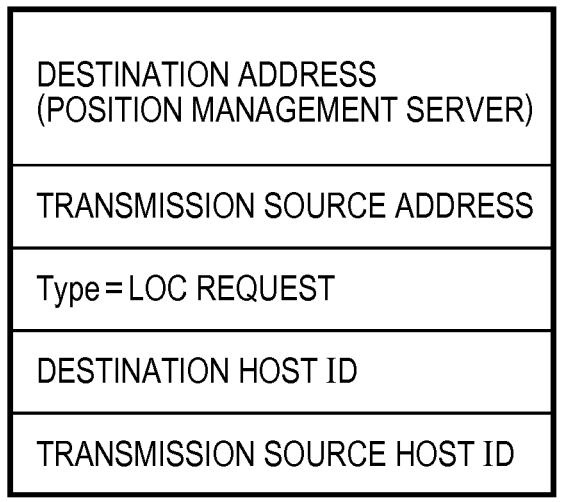
FIGS. 3A and 3B are diagrams illustrating examples of a location (LOC) request message and a LOC reply message, according to an embodiment.
Figure 3B:
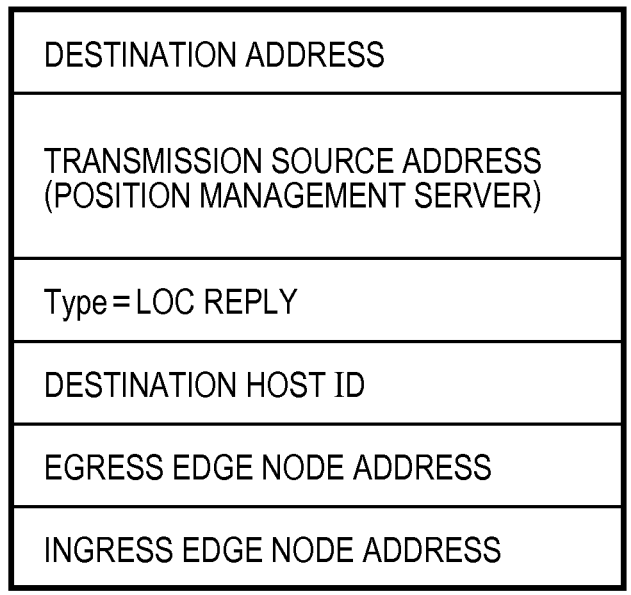

FIGS. 3A and 3B are diagrams illustrating respective examples of a LOC request message and a LOC reply message, according to an embodiment. FIG. 3A illustrates an example of information elements included in a LOC request message. A LOC request message includes a destination address, a transmission source address, Type, information identifying a communication device 1 serving as a destination of the packet 6 (destination host ID), and information identifying a communication device 1 serving as a transmission source of the packet 6 (transmission source host ID). In the example of FIG. 3A, Type is set at "LOC request" indicating that the LOC request message is a control message for requesting an address of an egress edge node associated with the communication device 1 serving as a destination. A destination of a LOC request message is the location management server 10. In a transmission source field of the LOC request message, an address that is assigned to a transfer device 20 transmitting the LOC request message is stored. Further, the information identifying the communication device 1 serving as a destination of the packet 6 is an address (destination host ID) assigned to the communication device 1 serving as a destination, and the information identifying the communication device 1 serving as a transmission source of the packet 6 is an address (transmission source host ID) assigned to the communication device 1 serving as a transmission source.

FIG. 3B illustrates an example of information elements included in a LOC reply message. A LOC reply message includes a destination address, a transmission source address, Type, information identifying a communication device 1 serving as a destination of the packet 6, an address of an egress edge node, and an address of an ingress edge node. A transmission source of the LOC reply message is the location management server 10. A destination of the LOC reply message is selected by the location management server 10 as described later. For example, a destination of the LOC reply message is a transfer device 20 that is selected by the location management server 10 as an ingress edge node of a communication tunnel coupling the ingress edge node and the egress edge node. Further, the LOC reply message may be transmitted to an ingress edge node that has transmitted a LOC request message. "Type=LOC reply" is information indicating that the LOC reply is a control message for advertising an address of an egress edge node in response to the LOC request message.

The reception unit 21 receives a packet that is transmitted or transferred to the transfer device 20. For example, the reception unit 21 receives a packet from the communication device 1 included in an access network and other transfer devices 20 included in the core network 3. Further, the reception unit 21 receives a LOC reply message transmitted from the location management server 10. The reception unit 21 outputs the received packet to the message type discrimination unit 22.

The message type discrimination unit 22 determines a type of an inputted packet and sorts the packet. For example, the message type discrimination unit 22 outputs a data packet which is received from an access network, to the transfer control unit 25 and outputs the encapsulated packet 7 received from the core network 3, to the decapsulation unit 24. The message type discrimination unit 22 outputs a LOC reply message to the LOC reply processing unit 42. Further, the message type discrimination unit 22 outputs, out of encapsulated packets 7 received from the core network 3, a packet that is to be transferred to other transfer devices 20 by means of tunnel communication, to the transfer control unit 25.

The encapsulation unit 23 encapsulates a packet inputted from the transfer control unit 25. FIG. 4 is a diagram illustrating examples of formats of a packet and an encapsulated packet, according to an embodiment. The packet 6 includes a data field and a header. The header of the packet 6 includes a transmission source address field and a destination address field. For example, when an address of the communication device is IP1 and an address of the communication device 1b is IP2, the packet 6 to be transmitted from the communication device is to the communication device 1b is expressed as a packet 6a of FIG. 4. Hereinafter, the header of the packet 6 will be also referred to as an "inner header" so as to facilitate discrimination from an outer header.

The encapsulation unit 23 performs encapsulation by adding an outer header to the packet 6 so as to generate an encapsulated packet 7. An outer header includes an address of an egress edge node and an address of an ingress edge node. For example, it is assumed that the communication device 1a belongs to a network to which a transfer device 20c belongs and the communication device 1b belongs to a network to which a transfer device 20b belongs. Further, it is assumed that an address LOC3 is assigned to the transfer device 20c and an address LOC2 is assigned to the transfer device 20b. In this case, the encapsulation unit 23 of the transfer device 20c encapsulates the packet 6a to generate the encapsulated packet 7a. Here, it is assumed that the encapsulation unit 23 is capable of arbitrarily accessing the transfer device table 53 so as to acquire an address of an egress edge node. The encapsulation unit 23 outputs the encapsulated packet 7 to the transfer control unit 25.

The decapsulation unit 24 of an egress edge node removes the outer header from the encapsulated packet 7 inputted from the message type discrimination unit 22, so as to restore the packet 6. The decapsulation unit 24 outputs the packet 6 to the transfer control unit 25.

The transfer control unit 25 determines a destination of the packet 6 by using the route table 51 and determines a destination of the encapsulated packet 7 by using the route table 52. Further, when a destination address of the packet 6 is an address assigned to a communication device 1 included in an access network connected to another transfer device 20, the transfer control unit 25 outputs the packet 6 to the encapsulation unit 23 to request the encapsulation unit 23 to encapsulate the packet 6. Upon receiving the packet 6, the transfer control unit 25 refers to the route table 51 by using a destination address in an inner header of the received packet 6 as a key, so as to determine a transfer destination. On the other hand, upon receiving the encapsulated packet 7, the transfer control unit 25 refers to the route table 52 so as to determine a transfer destination in accordance with an egress edge node. The transfer control unit 25 transfers the packet 6 or the encapsulated packet 7 whose transmission destination has been determined, via the transmission unit 27. The transfer control unit 25 further performs processing of deleting route information about a communication device 1 with which communication has not been performed for a time period exceeding a predetermined threshold value, from the route table 51.

The route information notification unit 26 notifies the inside of the access network of information on a route acquired from a LOC reply message or a LOC information notification message, as information on an external route. FIG. 5 is a diagram illustrating an example of a LOC information notification message, according to an embodiment. FIG. 5 illustrates an example of a case where a LS update packet of open shortest path first (OSPF) is used as a LOC information notification message. The LOC information notification message includes a destination address field, a transmission source address field, a protocol ID field, a message type field, a LS type field, a destination network address field, and a distance field. In the destination address field, an address indicating a destination of the LOC information notification message is recorded. A destination address of the LOC information notification message is a multicast address designating transfer devices 20 and routers 4 which are included in an access network to which the transfer device 20 serving as a transmission source of the LOC information notification message belongs. In the transmission source address field, an address assigned to the transfer device 20 serving as the transmission source of the LOC information notification message is stored. Further, there is a case where the transmission source address is an address assigned to a transfer device 20 that is notified as an ingress edge node by the LOC reply message, as will be described later. In the message type field of the LOC information notification message, LS update is designated. In the destination network address field, an address of an access network including the communication device 1 serving as a destination of the packet 6 is stored. In the distance field, the number of hops from the ingress edge node to the egress edge node is stored. Here, the distance field is optional, and the distance field does not have to be included in a LOC information notification message.

The transmission unit 27 transmits a packet that is transmitted or transferred from the transfer device 20. For example, the transmission unit 27 transfers the packet 6 and the encapsulated packet 7 in accordance with an instruction from the transfer control unit 25. Further, the transmission unit 27 transmits a LOC request message inputted from the LOC request unit 41 to the location management server 10 and transmits a LOC information notification message inputted from the route information notification unit 26 to transfer devices 20 and routers 4 included in the access network.

The learning unit 31 extracts a transmission source address from a packet generated by the communication device 1 included in an access network and registers the transmission source address in the route table 51 as route information. The position information notification generation unit 32 generates position information by associating the transmission source address extracted by the learning unit 31 with an address assigned to the transfer device 20. The position information notification generation unit 32 generates a packet (position information notification) which is used for notifying the location management server 10 of the position information. The position information notification generation unit 32 transmits the position information notification to the location management server 10 via the transmission unit 27.

The LOC request unit 41 generates a LOC request message to perform processing for inquiring information on an egress edge node from the location management server 10. The LOC request unit 41 generates a LOC request message when a communication device 1 serving as a destination of the packet 6 is included in an access network connected to another transfer device 20 and information on an egress edge node of a communication tunnel associated with the communication device 1 is not recorded in the transfer device table 53. The LOC reply processing unit 42 processes a LOC reply message received from the location management server 10. The LOC reply processing unit 42 extracts, from the LOC reply message, a combination of addresses of the communication device 1 serving as a destination and the egress edge node, and records the combination of addresses in the transfer device table 53.

Figure 6:
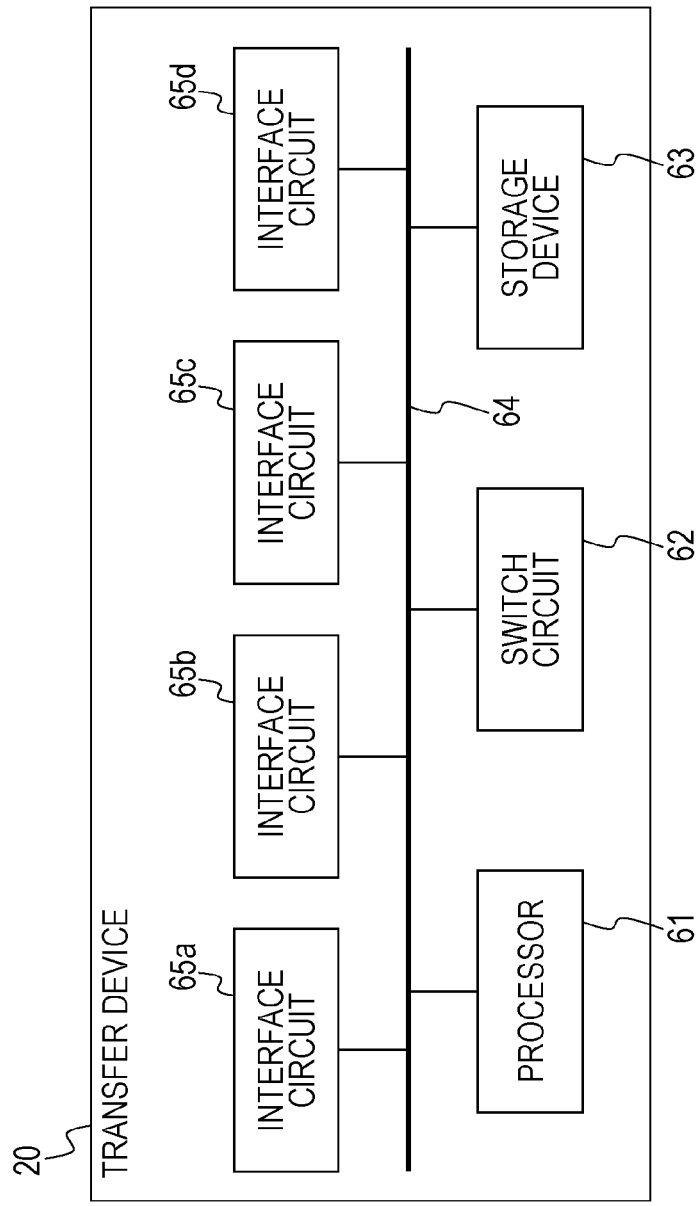
FIG. 6 is a diagram illustrating an example of a hardware configuration of a transfer device, according to an embodiment.

FIG. 6 is a diagram illustrating an example of a hardware configuration of a transfer device, according to an embodiment. The transfer device 20 includes a processor 61, a switch circuit 62, a storage device 63, a bus 64, and interface circuits 65 (65a to 65d). The transfer device 20 may be implemented as a router, for example. In the example of FIG. 6, the transfer device 20 is provided with four interface circuits 65 which are the interface circuits 65 (65a to 65d), but the number of the interface circuits 65 included in the transfer device 20 is arbitrary.

The processor 61 may be an arbitrary processing circuit including a central processing unit (CPU). The processor 61 may be configured to operate as the message type discrimination unit 22, the encapsulation unit 23, the decapsulation unit 24, the route information notification unit 26, the position information processing unit 30, and the LOC information processing unit 40. Here, the processor 61 may be configured to execute a program which is stored in the storage device 63, for example. The transfer control unit 25 is realized by the processor 61 and the switch circuit 62. The storage device 63 operates as the storage unit 50. Further, the storage device 63 arbitrarily stores data obtained by an operation of the processor 61 and data used for processing of the processor 61. The bus 64 connects the processor 61, the switch circuit 62, the storage device 63, and the interface circuits 65 so as to enable mutual reception/transmission of data. The reception unit 21 and the transmission unit 27 are realized by the interface circuits 65.

Figure 7:
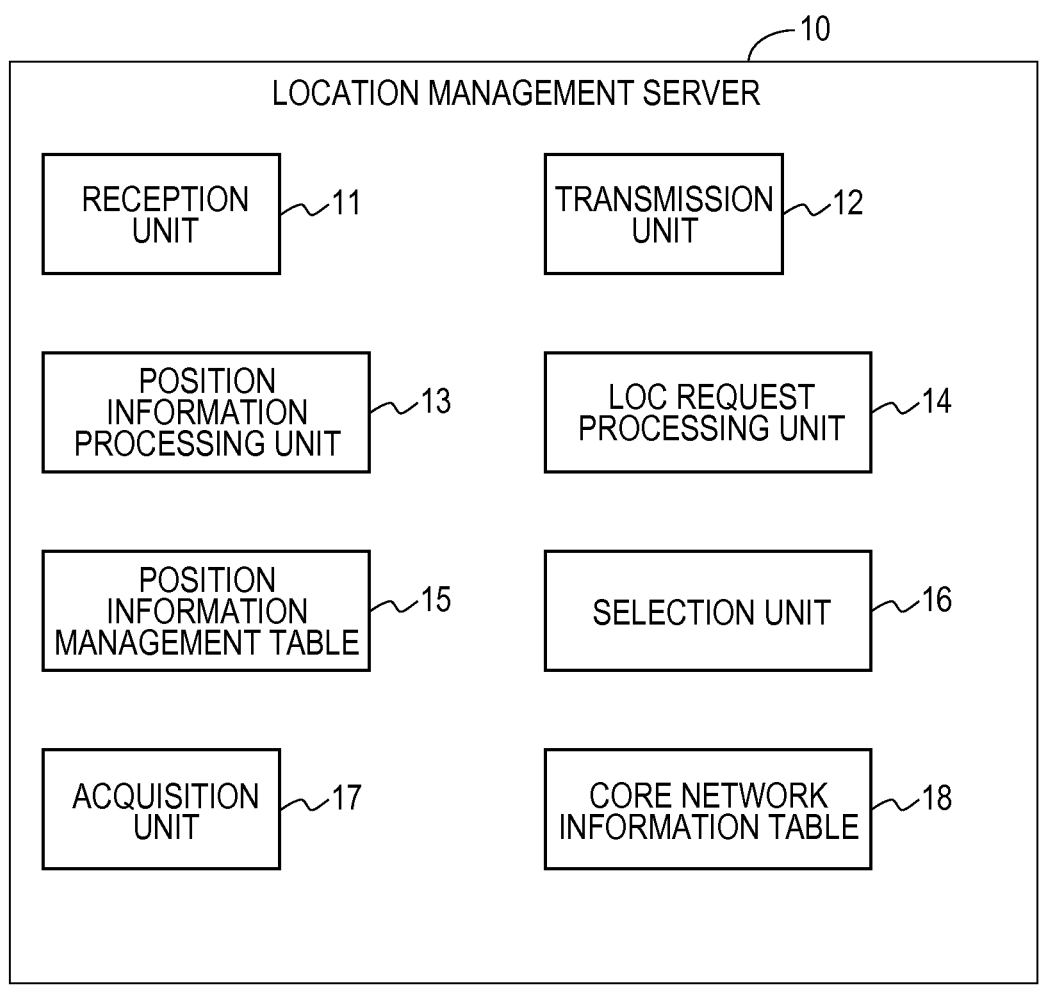
FIG. 7 is a diagram illustrating a configuration example of a location management server, according to an embodiment.

FIG. 7 is a diagram illustrating a configuration example of a location management server, according to an embodiment. The location management server 10 includes a reception unit 11, a transmission unit 12, a position information processing unit 13, a LOC request processing unit 14, a position information management table 15, a selection unit 16, an acquisition unit 17, and a core network information table 18.

The reception unit 11 receives a LOC request message, position information notification, a packet including information on the core network 3, and the like. The reception unit 11 outputs position information notification to the position information processing unit 13 and outputs a LOC request message to the LOC request processing unit 14. Further, the reception unit 11 outputs a packet including information on the core network 3 to the acquisition unit 17.

The position information processing unit 13 records, in the position information management table 15, information included in the position information notification which is inputted from the reception unit 11. In the position information management table 15, an address of a transfer device 20 serving as a transmission source of the position information notification and an address of a communication device 1 included in an access network to which the transfer device 20 belongs are stored in association with each other.

The LOC request processing unit 14 acquires an address of a communication device 1 serving as a destination of the packet 6 and an address of a communication device 1 serving as a transmission source of the packet 6, from a LOC request message. The LOC request processing unit 14 searches the position information management table 15 by using the address of the communication device 1 serving as a destination of the packet 6, so as to set the obtained address as an address of an egress edge node. Further, the LOC request processing unit 14 searches the position information management table 15 by using the address of the communication device 1 serving as a transmission source of the packet 6 as a key, so as to specify transfer devices 20 that are candidates for an ingress edge node. For example, it is assumed that the communication device 1a, the transfer device 20a, and the transfer device 20c are included in the access network A1, and the communication device 1b and the transfer device 20b are included in the access network A2. When the packet 6 is transmitted from the communication device 1a to the communication device 1b in this situation, the LOC request processing unit 14 sets the transfer device 20b as an egress edge node and sets the transfer device 20a and the transfer device 20c as candidates for an ingress edge node. The LOC request processing unit 14 outputs information on the egress edge node and the candidates for the ingress edge node, to the selection unit 16.

The selection unit 16 selects an ingress edge node from among the candidates for the ingress edge node which are notified from the LOC request processing unit 14. The selection unit 16 obtains routes to the egress edge node for respective candidates for the ingress edge node and states of the respective routes by using the core network information table 18 and compares the obtained states with one another. The selection unit 16 selects, from among the candidates for an ingress edge node, a transfer device 20 coupled to the egress edge node via a route whose communication state is relatively favorable, as the ingress edge node. For example, it is assumed that candidates for an ingress edge node are the transfer device 20a and the transfer device 20c and a state of a route from the transfer device 20c to the egress edge node is more favorable than a state of a route from the transfer device 20a to the egress edge node. In this case, the selection unit 16 determines the transfer device 20c as the ingress edge edge node. Upon determining the ingress edge node, the selection unit 16 generates a LOC reply message and outputs the LOC reply message to the transmission unit 12.

The acquisition unit 17 collects information on topology, information on a bandwidth of each link, and a congestion state in the core network 3. The acquisition unit 17 may acquire these pieces of information, for example, by using simple network management protocol (SNMP). Further, when distance vector or path vector routing protocol is employed in the core network 3, the acquisition unit 17 acquires, from respective transfer devices 20, distances to other edge nodes and route information. For example, when the distance vector routing protocol is employed, the acquisition unit 17 may acquire information indicating "(destination, distance)=(LOC2, X1), (LOC3, X2)", from the transfer device 20a. In a similar manner, the acquisition unit 17 may acquire information indicating "(destination, distance)= (LOC1, Y1), (LOC3, Y2)", from the transfer device 20c. Here, X1, X2, Y1, and Y2 are information representing a distance between two devices, such as the number of hops. In a case of the path vector routing protocol, the acquisition unit 17 acquires information "ISP1→ISP3" in association with LOC2 and acquires information indicating "ISP1→ISP3→ISP2" in association with LOC3, from the transfer device 20a. Here, a right-pointing arrow denotes the order of ISPs through which a packet passes. For example, information (LOC2, ISP1→ISP3) acquired from the transfer device 20a indicates that a packet may pass the ISP1 and then the ISP3 from the transfer device 20a to reach the transfer device 20b.

When a link state or hierarchical link state routing protocol is employed in the core network 3, the acquisition unit 17 grasps topology of the whole core network 3 by acquiring route information from at least one of nodes in the core network 3. When the link state or hierarchical link state routing protocol is employed, the acquisition unit 17 acquires information on a combination of two devices which are connected with each other in a set of transfer devices 20 and routers 4. For example, in the case of networks of FIGS. 9A and 9B described later, the acquisition unit 17 may acquires information of (LOC1, router 4b), (router 4b, router 4d), and the like.

The acquisition unit 17 may acquire bandwidth information in addition to topology information and further acquire a congestion state from these acquired pieces of information. The acquisition unit 17 stores the acquired information on the core network 3 in the core network information table 18. Therefore, the core network information table 18 may include information such as presence/absence of an occurrence of a failure, a degree of congestion, and a bandwidth.

The transmission unit 12 transmits a LOC reply message to a transfer device 20 serving as a destination of the LOC reply message. The transmission unit 12 also transmits a packet that is generated in the acquisition unit 17 to acquire information on the core network 3.

Figure 8:
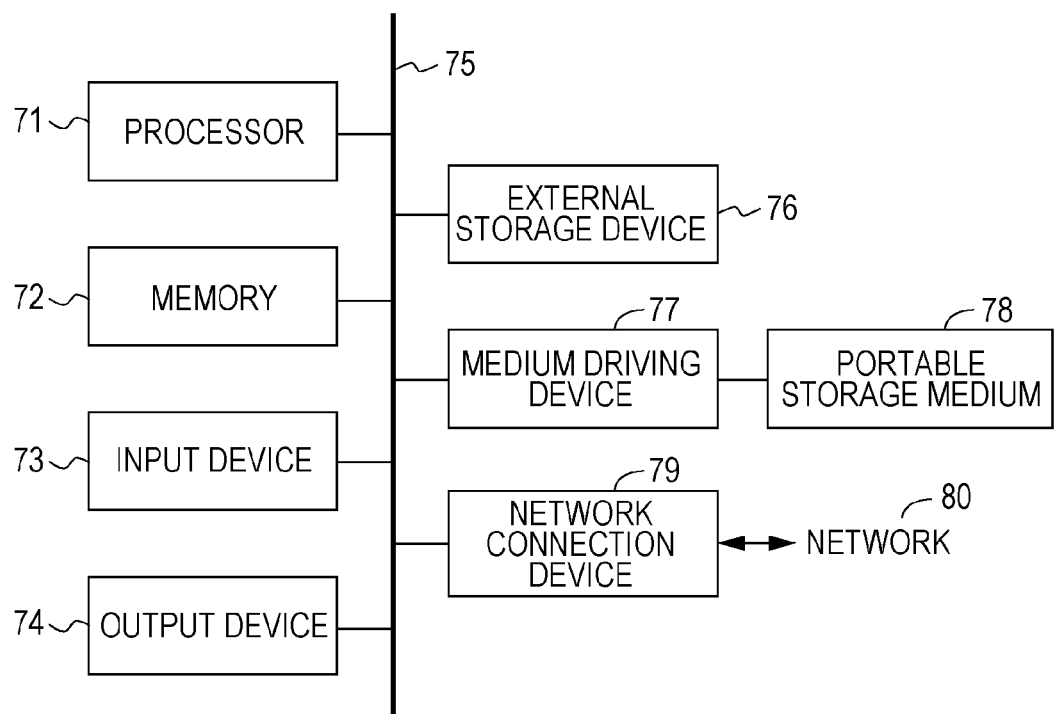
FIG. 8 is a diagram illustrating an example of a hardware configuration of a location management server, according to an embodiment.

FIG. 8 is a diagram illustrating an example of a hardware configuration of a location management server, according to an embodiment. The location management server 10 includes a processor 71, a memory 72, an input device 73, an output device 74, a bus 75, an external storage device 76, a medium driving device 77, and a network connection device 79. The location management server 10 may be implemented, for example, by using a computer.

The processor 71 may be configured as an arbitrary processing circuit including a central processing unit (CPU). The processor 71 operates as the position information processing unit 13, the LOC request processing unit 14, the selection unit 16, and the acquisition unit 17. Here, the processor 71 is configured to execute a program, for example, which is stored in the external storage device 76. The memory 72 stores the position information management table 15 and the core network information table 18. Further, the memory 72 arbitrarily stores data obtained by an operation of the processor 71 and data used for processing of the processor 71. The network connection device 79 performs processing for communication with the transfer device 20 and operates as the reception unit 11 and the transmission unit 12.

The input device 73 may be realized, for example, as a button, a keyboard, and a mouse, and the output device 74 may be realized as a display and the like. The bus 75 is connected so as to enable mutual reception/transmission of data among the processor 71, the memory 72, the input device 73, the output device 74, the external storage device 76, the medium driving device 77, and the network connection device 79. The external storage device 76 stores a program, data, and the like, and provides the stored information to the processor 71 and the like on a timely basis. The medium driving device 77 is configured to output data stored in the memory 72 and the external storage device 76 to a portable storage medium 78, and to read a program, data, and the like from the portable storage medium 78. Here, the portable storage medium 78 may be an arbitrary portable storage medium such as a floppy disk, a magneto-optical (MO) disk, a compact disc recordable (CD-R), and a digital versatile disk recordable (DVD-R).

First Embodiment

Figure 9A:
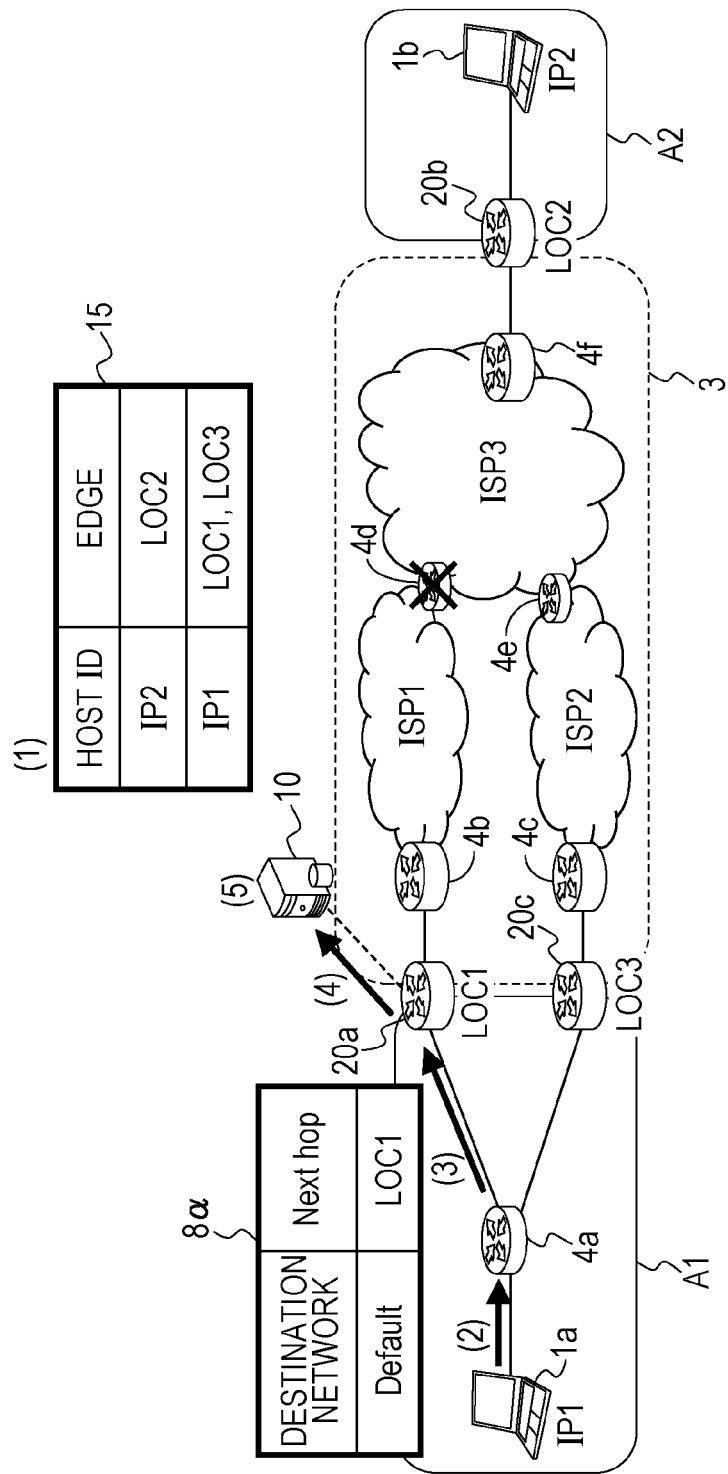
FIGS. 9A and 9B are diagrams illustrating an example of a communication method, according to a first embodiment.
Figure 9B:
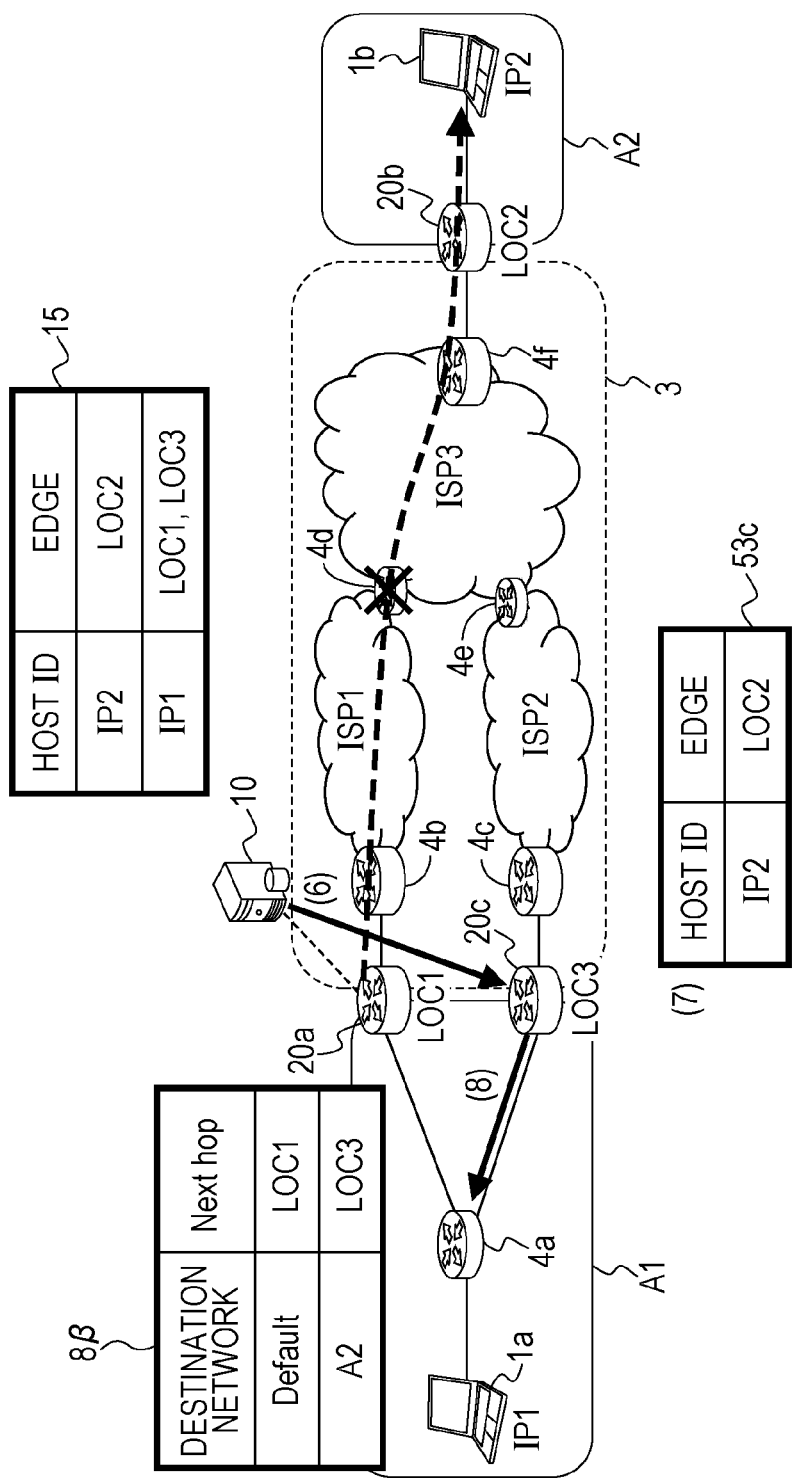
Figure 10:
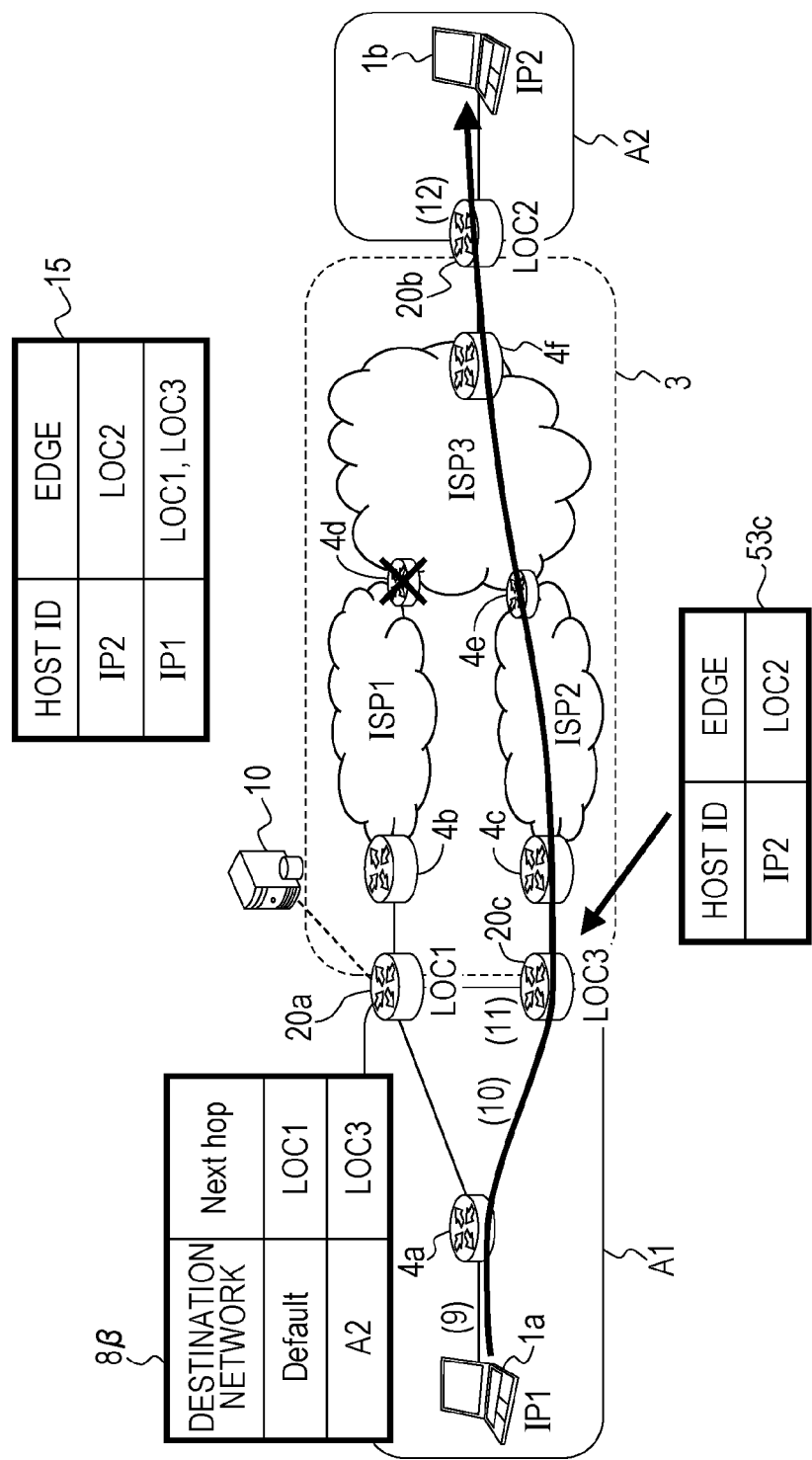
FIG. 10 is a diagram illustrating an example of a communication method, according to a first embodiment.

FIGS. 9A, 9B, and 10 are diagrams illustrating an example of a communication method, according to a first embodiment. An example of processing that is performed when the packet 6 is transmitted from the communication device 1a to the communication device 1b is described below with reference to FIGS. 9A, 9B, and 10. In the example below, it is assumed that the communication device 1a serving as a transmission source, the router 4a, the transfer device 20a, and the transfer device 20c are located in the access network A1 and the communication device 1b serving as a destination and the transfer device 20b are located in the access network A2, as depicted in FIG. 9A. It is assumed that the router 4a is capable of transferring a packet received from the communication device 1a to both the transfer device 20a and the transfer device 20c. It is assumed that the ISP1 to the ISP3 are included in the core network 3 and are mutually connected by the routers 4 (4d, 4e) and a failure has occurred at the router 4d. The transfer device 20a connects the access network A1 and the ISP1 in the core network 3 via the router 4b. The transfer device 20b connects the access network A2 and the ISP3 in the core network 3 via a router 4f. Further, the transfer device 20c connects the access network A1 and the ISP2 in the core network 3 via the router 4c. Further, it is assumed that addresses are assigned as described below:

Address of transfer device 20a: LOC1
Address of transfer device 20b: LOC2
Address of transfer device 20c: LOC3
Address of communication device 1a: IP1
Address of communication device 1b: IP2

In the following description, the same alphabet as that included in the reference character of a transfer device 20 that is performing an operation is added on the tail end of a reference character of a component included in the transfer device 20, so as to facilitate which one of the transfer devices 20a to 20c is performing the operation. For example, the learning unit 31 included in the transfer device 20b is denoted as a "learning unit 31b", while the learning unit 31 included in the transfer device 20a is denoted as a "learning unit 31a". Numbers in parentheses in FIGS. 9A, 9B, and 10 indicate procedures which will be described below.

(1) When the communication device is transmits a packet, the transfer device 20a and the transfer device 20c learn that the communication device is included in the access network A1. For example, the learning unit 31a of the transfer device 20a outputs a transmission source address (IP1) included in a header of the packet transmitted by the communication device 1a, to the position information notification generation unit 32a and records the transmission source address in a route table 51a on a timely basis. The position information notification generation unit 32a transmits position information notification in which the address (LOC1) assigned to the transfer device 20a is associated with the address of the communication device 1a, to the location management server 10 via a transmission unit 27a. Similar processing is performed in the transfer device 20c so that position information notification in which the address (IP1) of the communication device is associated with the address (LOC3) of the transfer device 20c to the location management server 10.

Further, when the communication device 1b transmits a packet, the transfer device 20b learns the address of the communication device 1b and further transmits position information notification to the location management server 10. At this time, the transfer device 20b transmits position information notification in which the address (IP2) of the communication device 1b is associated with an address (LOC2) of the transfer device 20b, to the location management server 10.

Upon receiving position information notification from the transfer devices 20a, 20b and 20c, the position information processing unit 13 of the location management server 10 records the addresses of the communication devices 1 and the addresses of the transfer devices 20, which are included in the respective position information notification, in the position information management table 15 in association with each other. Accordingly, the position information management table 15 of the location management server 10 holds information as depicted in the position information management table 15 of FIG. 9A.

(2) The communication device is transmits a packet 6 (6a of FIG. 4) addressed to the communication device 1b. A destination address of the packet 6 is the address (IP2) of the communication device 1b and a transmission source address thereof is the address (IP1) of the communication device 1a.

(3) The router 4a receives the packet 6a from the communication device 1a. Here, it is assumed that the router 4a is provided with a routing table 8a as depicted in FIG. 9A. The router 4a obtains a network address of the access network A2 on the basis of the destination address of the packet 6a and a subnet mask. The router 4a searches the routing table 8α for a transfer destination associated with the obtained network address. In the case, since a route to the access network A2 is not recorded in the routing table 8α of the router 4a, the router 4a transfers the packet 6a to the transfer device 20a using a default route.

(4) The transfer device 20a receives the packet 6a via the reception unit 21a. The message type discrimination unit 22a outputs the packet 6a to the transfer control unit 25a. Since the communication device 1b serving as a destination of the packet 6a is not included in the access network A1, the transfer control unit 25a determines to perform tunnel communication and outputs the packet 6a to the encapsulation unit 23a. The encapsulation unit 23a tries to specify an egress edge node by referring to the transfer device table 53a. However, when the packet 6a addressed to the communication device 1b first arrives at the transfer device 20a, an address of an egress edge node associated with the communication device 1b is not recorded in the transfer device table 53a. Therefore, the encapsulation unit 23a requests the LOC request unit 41a to acquire information on an egress edge node. The LOC request unit 41a transmits a LOC request message to the location management server 10 in response to the request from the encapsulation unit 23a, where the LOC request message includes the following information elements:

Destination address: Address of location management server 10
Transmission source address: LOC1
Type: LOC request
Address of communication device which is destination: IP2
Address of communication device which is transmission source: IP1

(5) Upon receiving the LOC request message, the LOC request processing unit 14 of the location management server 10 searches the position information management table 15 for candidates for an ingress edge node and an egress edge node. In the case, since the LOC request processing unit 14 refers to the position information management table 15 depicted in FIG. 9A, LOC2 associated with the address (IP2) of the communication device 1b serving as the destination becomes an address of the egress edge node. Further, the LOC request processing unit 14 determines LOC1 and LOC3 which are associated with the address (IP1) of the communication device is serving as the transmission source, as addresses assigned to the transfer devices 20 that are candidates for an ingress edge node. The LOC request processing unit 14 outputs, to the selection unit 16, the following information items:

Address of the egress edge node: LOC2
Addresses assigned to candidates for the ingress edge node: LOC1, LOC3

(6) The selection unit 16 calculates a route from the transfer device 20a assigned LOC1 to the transfer device 20b assigned LOC2, by using the core network information table 18. The selection unit 16 also calculates a route from the transfer device 20c assigned LOC3 to the transfer device 20b. Further, the selection unit 16 determines which state is more favorable between a state of the route from the transfer device 20a to the transfer device 20b and a state of the route from the transfer device 20c to the transfer device 20b, by using the core network information table 18. Here, it is assumed that an occurrence of a failure in the router 4d is recorded in the core network information table 18. Further, it is assumed that the selection unit 16 has determined that communication is not possible between the transfer device 20a and the transfer device 20b but communication is possible between the transfer device 20c and the transfer device 20b, as illustrated in FIG. 9B. Then, the selection unit 16 determines the transfer device 20c as the ingress edge node and generates a LOC reply message addressed to the transfer device 20c, where the LOC reply message includes, for example, the following information elements:

Destination address: LOC3
Transmission source address: Address of location management server 10
Type: LOC reply
Address of communication device serving as a destination: IP2
Address of egress edge node: LOC2
Address of ingress edge node: LOC3

The selection unit 16 transmits the generated LOC reply message to the transfer device 20c via the transmission unit 12.

(7) The LOC reply message received at the transfer device 20c is inputted into the LOC reply processing unit 42c by the message type discrimination unit 22c. The LOC reply processing unit 42c determines, based on the LOC reply message, that an address of the egress edge node for the encapsulated packet 7 including a packet addressed to IP2 is LOC2 and the ingress edge node is the transfer device 20c. The LOC reply processing unit 42c updates the transfer device table 53c as depicted in FIG. 9B by using the information acknowledged based on the LOC reply message.

(8) The LOC reply processing unit 42c outputs the information determined based on the LOC reply message to the route information notification unit 26c. The route information notification unit 26c generates a LOC information notification message using the information inputted from the LOC reply processing unit 42c, where the LOC information notification message includes the following information elements:

Destination address: Router 4 and transfer device 20 in access network A1
Transmission source address: LOC3
Destination network address: Network address of access network A2

Upon receiving the LOC information notification message from the transfer device 20c, the router 4a updates a routing table thereof from the routing table 8α to the routing table 8β by recording information on a route to the access network A2.

(9) In the case, when no reception reply from the communication device 1b is received, the communication device 1a determines that transmission of the packet 6a has failed. Then, the communication device 1a retransmits a packet 6a including the same data as that of the packet 6a that was previously transmitted, as illustrated in FIG. 10.

(10) The router 4a receives the packet 6a from the communication device 1a. The router 4a determines that a transfer destination of the packet 6a is the access network A2, on the basis of the destination address of the packet 6a. Therefore, the router 4a transfers the packet 6a to the transfer device 20c in accordance with the routing table 8β.

(11) The packet 6a received at the transfer device 20c is inputted into the transfer control unit 25c by the message type discrimination unit 22c. When the transfer control unit 25c determines that the destination of the packet 6a is not present in the access network A1, the transfer control unit 25c outputs the packet 6a to the encapsulation unit 23c. The encapsulation unit 23c generates an encapsulated packet 7 by encapsulating the packet 6a using information recorded in the transfer device table 53c. In this case, since a destination address in the outer header (egress edge node address) is the address (LOC2) of the transfer device 20b and a source address in the outer header (ingress edge node address) is the address (LOC3) of the transfer device 20c, an encapsulated packet 7 depicted as 7a of FIG. 4 is generated. The encapsulation unit 23c outputs the encapsulated packet 7 to the transfer control unit 25c.

The transfer control unit 25c performs transfer control on the encapsulated packet 7 by referring to the destination address recorded in the outer header and the route table 52. The encapsulated packet 7 is transmitted to the transfer device 20b via the router 4c, the ISP2, the router 4e, the ISP3, and the router 4f.

(12) The encapsulated packet 7 transmitted to the transfer device 20b is decapsulated in the decapsulation unit 24b of the transfer device 20b, returning to a state of the packet 6a. The transfer control unit 25b transfers the packet 6a obtained by the decapsulation to the communication device 1b by referring to the route table 51b. As a result, the communication device 1b is able to receive the packet 6a from the communication device 1a.

Here, procedures described with reference to FIGS. 9A, 9B and 10 are an example, and the procedures may be changed. For example, such modification may be employed that when the node including a LOC reply processing unit 42 is designated as an ingress edge node, this LOC reply processing unit 42 outputs information obtained from a LOC reply message to the encapsulation unit 23. In the case of such modification, when the transfer device 20 that has transmitted a LOC request message is designated as an ingress edge node, an encapsulated packet 7 is generated by the encapsulation unit 23 at a time point of the procedure (7). For example, it is assumed that the transfer device 20a transmits a LOC request message to the location management server 10 in response to reception of the packet 6. In this case, when the transfer device 20a receives a LOC reply message in which the transfer device 20a is designated as an ingress edge node in response to the LOC request message, the transfer device 20a may transfer the encapsulated packet 7 including the packet 6 that has been previously held in the transfer device 20a. Therefore, traffic of the access network A1 is reduced.

The first embodiment is also applicable to a case where there exist no failures occurring in nodes, such as routers 4, included in the core network 3. An example of processing of a case where there exist no failures occurring in the core network 3 is described with reference to FIG. 11. Processing of procedures (1) to (5) and calculation of routes from respective ingress edge nodes to an egress edge node are the same as the processing which has been described with reference to FIG. 9A. Alphanumeric characters in parentheses in FIG. 11 indicate procedures which will be described below.

(6A) After calculating routes from respective ingress edge nodes to the egress edge node, the selection unit 16 refers to the core network information table 18 to compare states of respective obtained routes with one another. Since a failure has not occurred in nodes of the core network 3 in this case, the selection unit 16 determines which one of routes is in a favorable communication state by comparing congestion states, bandwidths, and the like. It is assumed that the selection unit 16 determines that a state of a route between the transfer device 20c and the transfer device 20b is more favorable than a state of a route between the transfer device 20a and the transfer device 20b. Then, the selection unit 16 determines the transfer device 20c as the ingress edge node of a communication tunnel. Further, the selection unit 16 transmits the LOC reply message described in the procedure (6) to both of the transfer device 20a and the transfer device 20c via the transmission unit 12.

Figure 11:
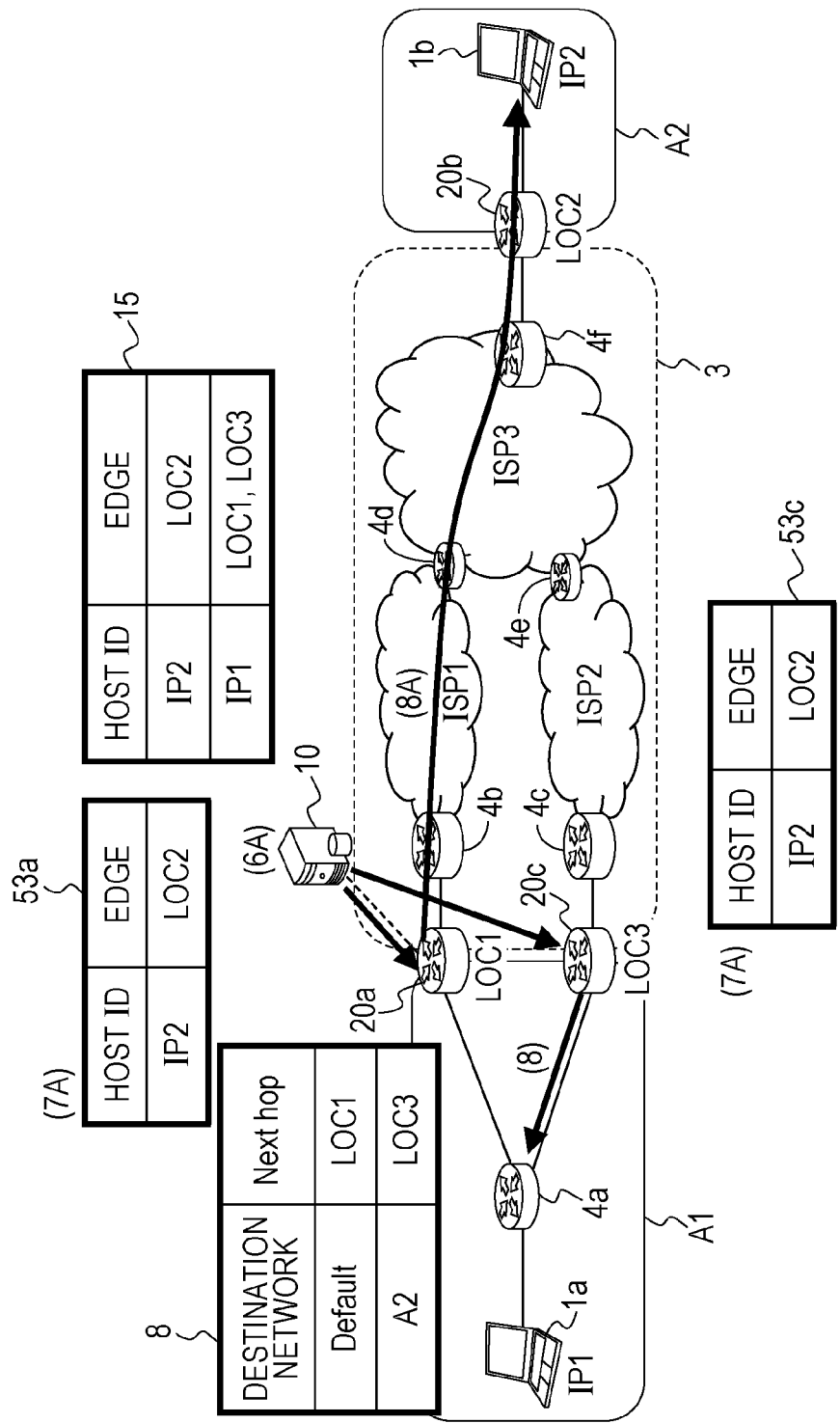
FIG. 11 is a diagram illustrating an example of a communication method, according to a first embodiment.

(7A) The LOC reply message is processed in both of the transfer device 20a and the transfer device 20c, and both of the transfer device table 53a and the transfer device table 53c are updated as illustrated in FIG. 11. Processing that is performed in updating of the transfer device tables 53 is similar to the procedure (7).

(8A) The LOC reply processing unit 42a determines that the transfer device 20a is not used as the ingress edge node in transmission of the encapsulated packet 7 including the packet 6 addressed to IP2, based on the information included in the LOC reply message. Accordingly, the LOC reply processing unit 42a determines not to perform transmission of a LOC information notification message to transfer devices 20 and routers 4 in the access network A1 and does not output the information included in the LOC reply message to the route information notification unit 26a.

The LOC reply processing unit 42a of the transfer device 20a outputs the information that has been used for updating the transfer device table 53a, to the encapsulation unit 23a as well. The encapsulation unit 23a encapsulates the packet 6a by using the information notified from the LOC reply processing unit 42a so as to generate an encapsulated packet 7 and output the encapsulated packet 7 to the transfer control unit 25a. The transfer control unit 25a determines a transmission destination by using the route table 52a and transmits the encapsulated packet 7 via the transmission unit 27a.

Meanwhile, an operation of the transfer device 20c is similar to the procedure (8). When recognizing that transmission of the packet 6a that has been transferred to the transfer device 20a is successful, the communication device 1a is able to transmit subsequent packets including data subsequent to that of the packet 6a, to the communication device 1b without performing retransmission of the packet 6a. Processing on packets including the subsequent data for the packet 6a is similar to the procedures (10) to (12). Thus, when a LOC reply message is transmitted to all the transfer devices 20 that are candidates for an ingress edge node, retransmission of a packet that has been transmitted to the transfer device 20a is unnecessary. Therefore, traffic in the access network A1 is reduced.

Figure 12:
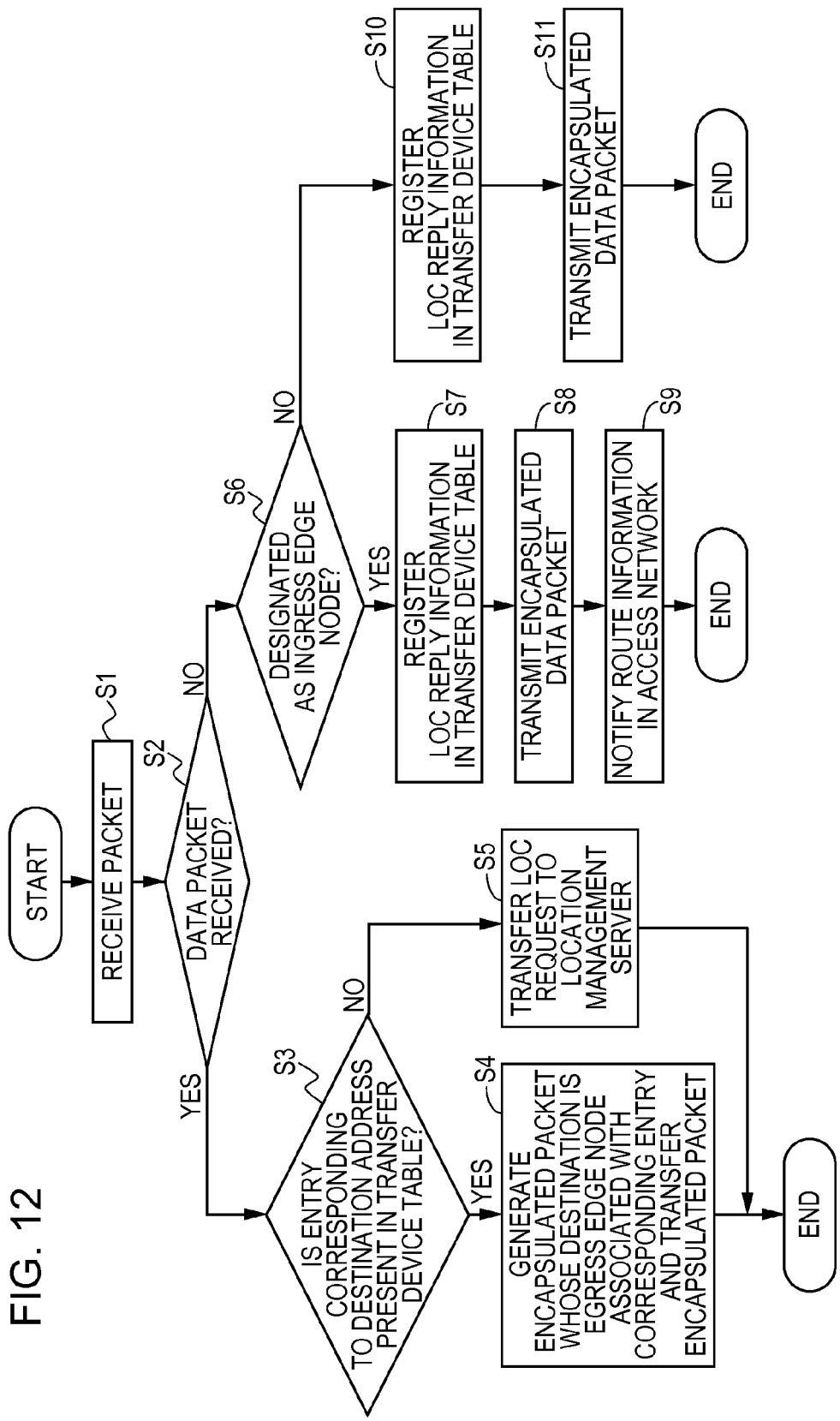
FIG. 12 is a diagram illustrating an example of an operational flowchart performed by a transfer device, according to a first embodiment.

FIG. 12 is a diagram illustrating an example of an operational flowchart performed by a transfer device, according to a first embodiment. FIG. 12 illustrates an example of an operation in a case where a transfer device 20 in an access network including a communication device 1 serving as a transmission source receives a packet from the access network side and when the transfer device 20 receives a LOC reply message from the location management server 10. Here, FIG. 12 illustrates an example, and orders of steps S7 to S9 may be arbitrarily changed, for example. Further, orders of steps S10 and S11 may be also changed.

The reception unit 21 receives a packet and outputs the packet to the message type discrimination unit 22 (step S1). The message type discrimination unit 22 determines whether or not the received packet is a data packet that is received from the access network (step S2). When the received packet is the data packet (Yes in step S2), the message type discrimination unit 22 outputs the data packet to the transfer control unit 25. When the received packet is a packet addressed to a communication device 1 located in another access network different from the access network to which the transfer device 20 is connected, the transfer control unit 25 requests the encapsulation unit 23 to encapsulate the packet. The encapsulation unit 23 searches the transfer device table 53 by using a destination address as a key so as to determine whether or not a corresponding entry is present (step S3). When a corresponding entry is present (Yes in step S3), the encapsulation unit 23 extracts the corresponding entry and generates an encapsulated packet 7 addressed to an egress edge node whose address is included in the extracted corresponding entry. Then, the transfer control unit 25 transfers the encapsulated packet 7 to the destination (step S4). On the other hand, when a corresponding entry is not present in the transfer device table 53 (No in step S3), the LOC request unit 41 transmits a LOC request message to the location management server 10 (step S5).

When the received packet is not the data packet (No in step S2), the message type discrimination unit 22 determines that the received packet is a LOC reply message and outputs the received packet to the LOC reply processing unit 42. The LOC reply processing unit 42 determines whether or not the node including the LOC reply processing unit 42 is designated as an ingress edge node (step S6). When the node is designated as the ingress edge node (Yes in step S6), the LOC reply processing unit 42 notifies the route information notification unit 26 of information included in the LOC reply message and records the information in the transfer device table 53 (step S7). Further, the LOC reply processing unit 42 notifies the encapsulation unit 23 of the information included in the LOC reply message. When the encapsulation unit 23 holds the packet 6, the encapsulation unit 23 encapsulates the data packet on the basis of the notified information. The encapsulated packet is transmitted to the egress edge node (step S8). The route information notification unit 26 transmits a LOC information notification message including the information notified from the LOC reply processing unit 42 to routers 4 and transfer devices 20 which are included in the access network (step S9).

On the other hand, when the node including this LOC reply processing unit 42 is not designated as the ingress edge node (No in step S6), the LOC reply processing unit 42 records the information included in the LOC reply message in the transfer device table 53 but does not notify the route information notification unit 26 of the information (step S10). The LOC reply processing unit 42 notifies the encapsulation unit 23 of the information included in the LOC reply message. When the encapsulation unit 23 holds the packet 6, the encapsulation unit 23 encapsulates the data packet on the basis of the notified information. The encapsulated packet is transmitted to the egress edge node (step S11).

FIG. 13 is a diagram illustrating an example of an operational flowchart performed by a location management server, according to a first embodiment. When the reception unit 11 receives a LOC request message, the reception unit 11 outputs the LOC request message to the LOC request processing unit 14 (step S21). The LOC request processing unit 14 searches the position information management table 15 for an entry associated with an address that is included in the LOC request message and assigned to a communication device 1 serving as a destination (step S22). In the LOC request message, the address of an egress edge node is an address of the transfer device 20 associated with an address of the communication device 1 serving as a destination. When an entry corresponding to the destination address is present in the position information management table 15, the LOC request processing unit 14 searches the position information management table 15 for an entry (a candidate for an ingress edge node) associated with an address that is included in the LOC request message and assigned to the communication device 1 serving as a transmission source (step S23). The LOC request processing unit 14 outputs the obtained result to the selection unit 16. The selection unit 16 determines whether or not the number of obtained candidates for an ingress edge node is plural (step S24).

When the number of obtained candidates for an ingress edge node is plural (Yes in step S24), the selection unit 16 selects, as the ingress edge node, one of the candidates that is coupled to the egress edge node via an optimal route on the basis of the state of the core network 3 (step S25). The location management server 10 transmits a LOC reply message including an address of the egress edge node to a transfer device 20 that has been selected as the ingress edge node by the selection unit 16 (step S26). Further, the location management server 10 transmits the LOC reply message including the address of the egress edge node also to a transfer device 20 serving as a transmission source of the LOC request message (step S27).

On the other hand, when the number of obtained candidates for an ingress edge node is one (No in step S24), a candidate for an ingress edge node is only the transfer device 20 that is the transmission source of the LOC request message. Therefore, the location management server 10 transmits the LOC reply message including the address of the egress edge node to the transfer device 20 that is the transmission source of the LOC request message (step S27). Further, when there is no entry corresponding to the address of the communication device 1 serving as the destination (No in S22), it is determined that a destination is unknown and error processing is performed (step S28).

Thus, according to the method described in the first embodiment, the location management server 10 receiving a LOC request message may select an ingress edge node depending on a state of the core network 3. Further, upon receiving a LOC reply message, the transfer device 20 selected as the ingress edge node advertises, in the access network, that a packet addressed to the communication device 1 serving as a communication destination is transferrable. Therefore, a transmission route in the access network may be established in accordance with the ingress edge node. According to the first embodiment, it is possible to secure a redundant route by performing multi-home connection using a plurality of edge nodes in an access network. In addition, there is advantage that a route is selected also depending on a state of the core network 3.

Second Embodiment

A second embodiment will be described with reference to FIGS. 14A and 14B in which a LOC reply message is not transmitted to a transfer device 20 that has not transmitted a LOC request message. In the second embodiment, positions of the communication devices 1, the routers 4, and the transfer devices 20 and addresses assigned to these devices are similar to those of the first embodiment.

(21) When a packet addressed to the communication device 1b is transmitted from the communication device 1a, a LOC request message is transmitted to the location management server 10 through processing similar to the procedures (1) to (4). Further, the LOC request processing unit 14 processes the LOC request message in a manner similar to the procedure (5). For ease of explanation, FIG. 14A uses the numbers (1) to (5) of the procedures which have been used in the description of FIG. 9A.

(22) Calculation of routes from respective candidates for an ingress edge node to an egress edge node is similar to the processing described in the procedure (6) with reference to FIGS. 9A and 9B. The selection unit 16 compares states of obtained routes with one another by using information in the core network information table 18, thereby selecting an ingress edge node able to use a relatively favorable route. In this case, it is assumed that the transfer device 20c is selected as the ingress edge node.

Then, the selection unit 16 generates a LOC reply message whose destination is the transfer device 20a serving as a transmission source of the LOC request message, where the LOC reply message includes the following information elements:

Destination address: LOC1
Transmission source address: Address of location management server 10
Type: LOC reply
Address of communication device serving as a destination: IP2
Address of egress edge node: LOC2
Address of ingress edge node: LOC3

The selection unit 16 transmits the generated LOC reply message to the transfer device 20a via the transmission unit 12.

(23) The LOC reply processing unit 42a of the transfer device 20a determines that an address of the egress edge node for the encapsulated packet 7 including a packet addressed to IP2 is LOC2 and the ingress edge node is the transfer device 20c, based on the LOC reply message. The LOC reply processing unit 42a updates the transfer device table 53a as illustrated in FIG. 14A, by using the information determined from the LOC reply message.

(24) The LOC reply processing unit 42a outputs the information determined from the LOC reply message to the route information notification unit 26a. The route information notification unit 26a sets the transfer device 20c as a transmission source by using the information inputted from the LOC reply processing unit 42a and generates a LOC information notification message including the following information elements:

Destination address: Router 4 and transfer device 20 in access network A1
Transmission source address: LOC3
Destination network address: Network address of access network A2

That is, the transfer device 20a pretends to be the transfer device 20c and transmits the LOC information notification message to routers 4 and transfer devices 20 in the access network A1.

Figure 14B:
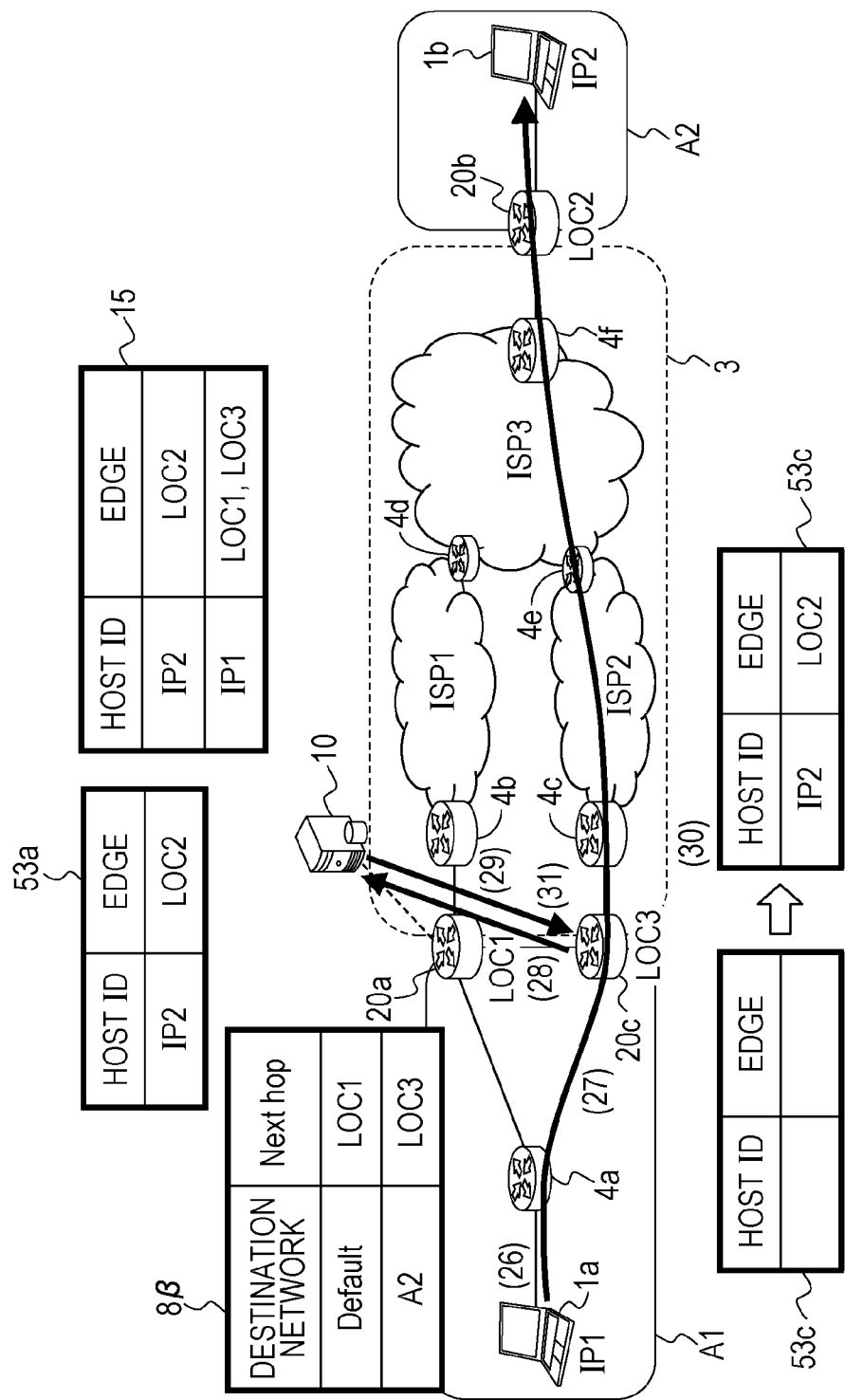

Upon receiving the LOC information notification message from the transfer device 20a, the router 4a update a routing table from the routing table 8α (depicted in FIG. 14A) to the routing table 8β (depicted in FIG. 14B) by recording information on a route to the access network A2 (refer to FIG. 14B).

(25) The LOC reply processing unit 42a of the transfer device 20a also outputs the information used for updating the transfer device table 53a to the encapsulation unit 23al. The encapsulation unit 23a encapsulates the packet 6a by using the information notified from the LOC reply processing unit 42a, to generate an encapsulated packet 7 and output the encapsulated packet 7 to the transfer control unit 25a. The transfer control unit 25a determines a transmission destination by using the route table 52a and transmits the encapsulated packet 7 via the transmission unit 27a. The encapsulated packet 7 is processed by the transfer device 20b in a manner similar to the procedure (12) which has been described with reference to FIGS. 9A and 9B. As a result, the communication device 1b receives the packet 6a.

(26) Next, it is assumed that a packet 6b addressed to the communication device 1b is transmitted from the communication device 1a. In this case as well, the packet 6b is received at the router 4a.

(27) The router 4a determines that the packet 6b is a packet addressed to the access network A2 and transfers the packet 6b to the transfer device 20c, based on the routing table 8β.

(28) The message type discrimination unit 22c of the transfer device 20c outputs the packet 6b to the transfer control unit 25c. Since the destination of the packet 6b is not included in the access network A1, the transfer control unit 25c determines to perform tunnel communication and outputs the packet 6b to the encapsulation unit 23c. The encapsulation unit 23c tries to determine an egress edge node by referring to the transfer device table 53c. However, an egress edge node associated with the communication device 1b has not been recorded yet in the transfer device table 53c at this time point. Therefore, the encapsulation unit 23c requests the LOC request unit 41c to acquire information on the egress edge node. The LOC request unit 41c transmits a LOC request message to the location management server 10 in response to the request from the encapsulation unit 23c.

(29) The LOC request processing unit 14 of the location management server 10 outputs information on candidates for an ingress edge node and information on an egress edge node, to the selection unit 16 in a manner similar to the procedure (5). The selection unit 16 transmits a LOC reply message including an address of the ingress edge node and an address of the egress edge node, to the transfer device 20c serving as a transmission source of the LOC request message, through processing similar to the procedure (22). In this case, it is assumed that LOC3 and LOC2 are transmitted as the address of the ingress edge node and the address of the egress edge node, respectively.

(30) The LOC reply message received at the transfer device 20c is used for updating the transfer device table 53c in processing similar to the procedure (23). The transfer device tables 53c before and after the updating are depicted in FIG. 14B.

(31) By performing processing similar to the procedure (25) in the transfer device 20c, the packet 6b is transmitted to the communication device 1b.

Figure 15:
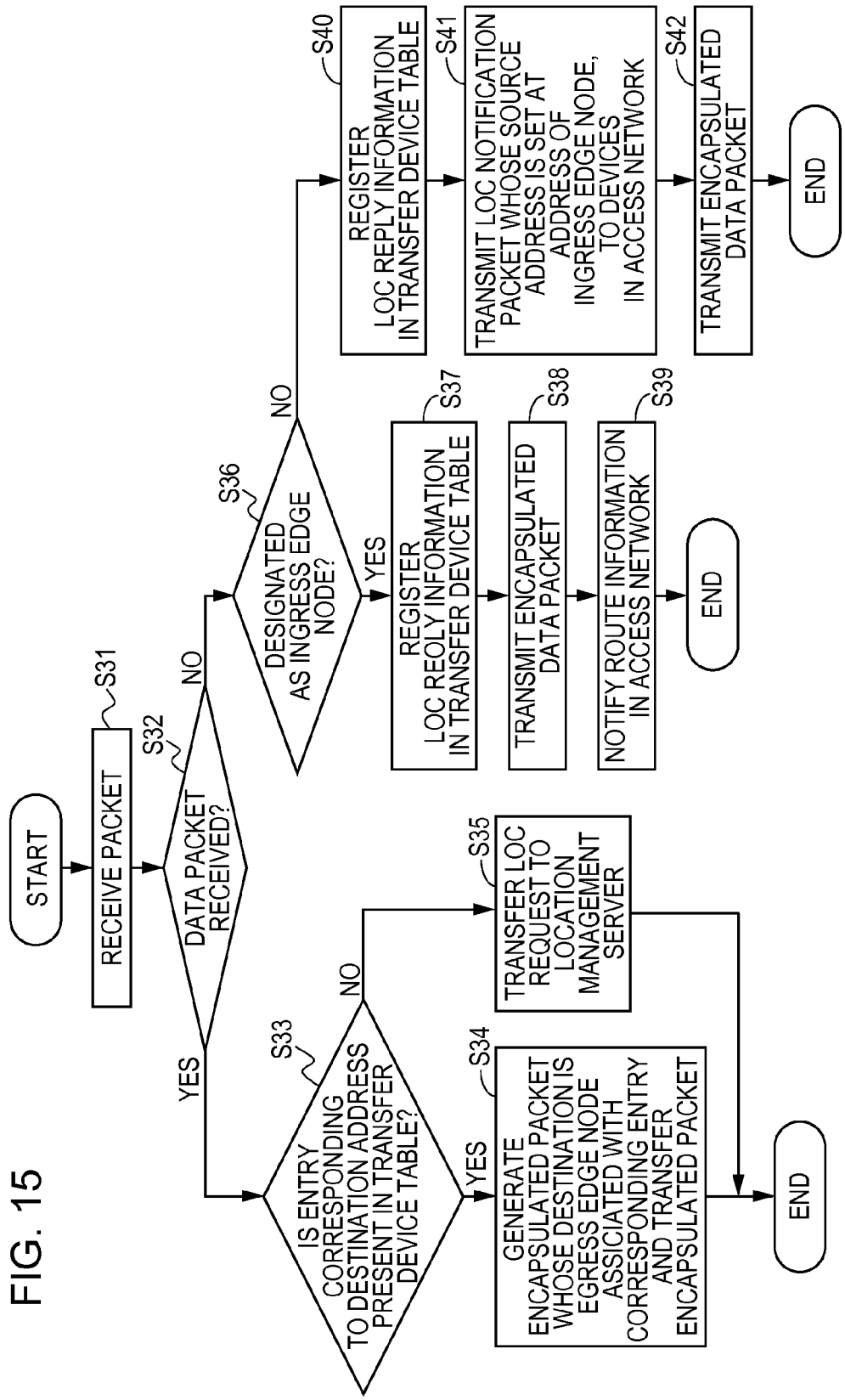
FIG. 15 is diagram illustrating an example of an operational flowchart of a transfer device that is set as a transfer destination of a default route, according to a second embodiment.

FIG. 15 is diagram illustrating an example of an operational flowchart of a transfer device that is set as a transfer destination of a default route, according to a second embodiment. FIG. 15 illustrates an example of an operation for a case where the transfer device 20 receives a packet from an access network side or a LOC reply message from the location management server 10. In the case, orders of steps S37 to S39 of FIG. 15 may be arbitrarily changed, for example, depending on implementation. Further, orders of steps S40 to S42 may be changed.

Processing performed in steps S31 to S39 is similar to that of steps S1 to S9 which have been described with reference to FIG. 12.

When it is determined that a LOC reply processing unit 42 has received the LOC reply message in which another transfer device 20 is designated as the ingress edge node (No in step S36), the LOC reply processing unit 42 records information included in the LOC reply message in the transfer device table 53 (step S40). Further, the LOC reply processing unit 42 notifies the route information notification unit 26 of the address of the ingress edge node included in the LOC reply message and information on a destination of the packet 6. The route information notification unit 26 transmits a LOC information notification message including the information notified from the LOC reply processing unit 42 and including, as a transmission source thereof, the address of the ingress edge node, to routers 4 and transfer devices 20 in the access network (step S41). Further, the LOC reply processing unit 42 notifies the encapsulation unit 23 of the information included in the LOC reply message. When the encapsulation unit 23 holds the packet 6, the encapsulation unit 23 encapsulates the packet 6 on the basis of the notified information so that the encapsulated packet is transmitted to the egress edge node (step S42).

In the second embodiment, the location management server 10 does not transmit a LOC reply message to a transfer device 20 that has not transmitted a LOC request message. Accordingly, an operation of the location management server 10 is represented, for example, as an operational flowchart obtained by deleting step S26 from the operational flowchart of FIG. 13.

In the second embodiment, the transfer device 20 designated as a transfer destination of a default route pretends to be an ingress edge node which is notified from the location management server 10 and transmits a LOC information notification message to devices in an access network. Therefore, it is possible for the router 4a to determine a transfer destination of the packet 6 on the basis of the LOC information notification message which is transmitted from the transfer device 20 pretending to be the ingress edge node. The transfer device 20 designated as the ingress edge node did not have information on an egress edge node at a time point of reception of the packet 6. However, the transfer device 20 is able to perform transfer of the packet 6 by inquiring information on an egress edge node from the location management server 10 after receiving the packet 6. Accordingly, in the second embodiment as well, it is possible to secure a redundant route employing multi-home connection, as is the case with the first embodiment.

Further, according to the second embodiment, there is such advantage that an existing router or the like may be used together in multi-home connection. In the first embodiment, a transfer device 20 that has not transmitted a LOC request message may receive a LOC reply message. Therefore, designing is made so that all the transfer devices 20 that are used for multi-home connection in the access network A1 are configured to handle a LOC reply message even if the transfer devices 20 have not transmitted a LOC request message. However, according to the second embodiment, only a transfer device 20 that has transmitted a LOC request message to the location management server 10 receives a LOC reply message. Therefore, a router complying with LISP may be used as a transfer device that is not set on a default route. For example, a routing destination of the default route of the router 4a is the transfer device 20a in the example of FIGS. 14A and 14B. Therefore, when a router 4h is used instead of the transfer device 20c, it is possible to implement multi-home connection in which the transfer device 20a and the router 4h are used in combination.

Third Embodiment

According to a third embodiment, a transfer device 90 may be configured to determine a transfer device serving as an ingress edge node.

Figure 16:
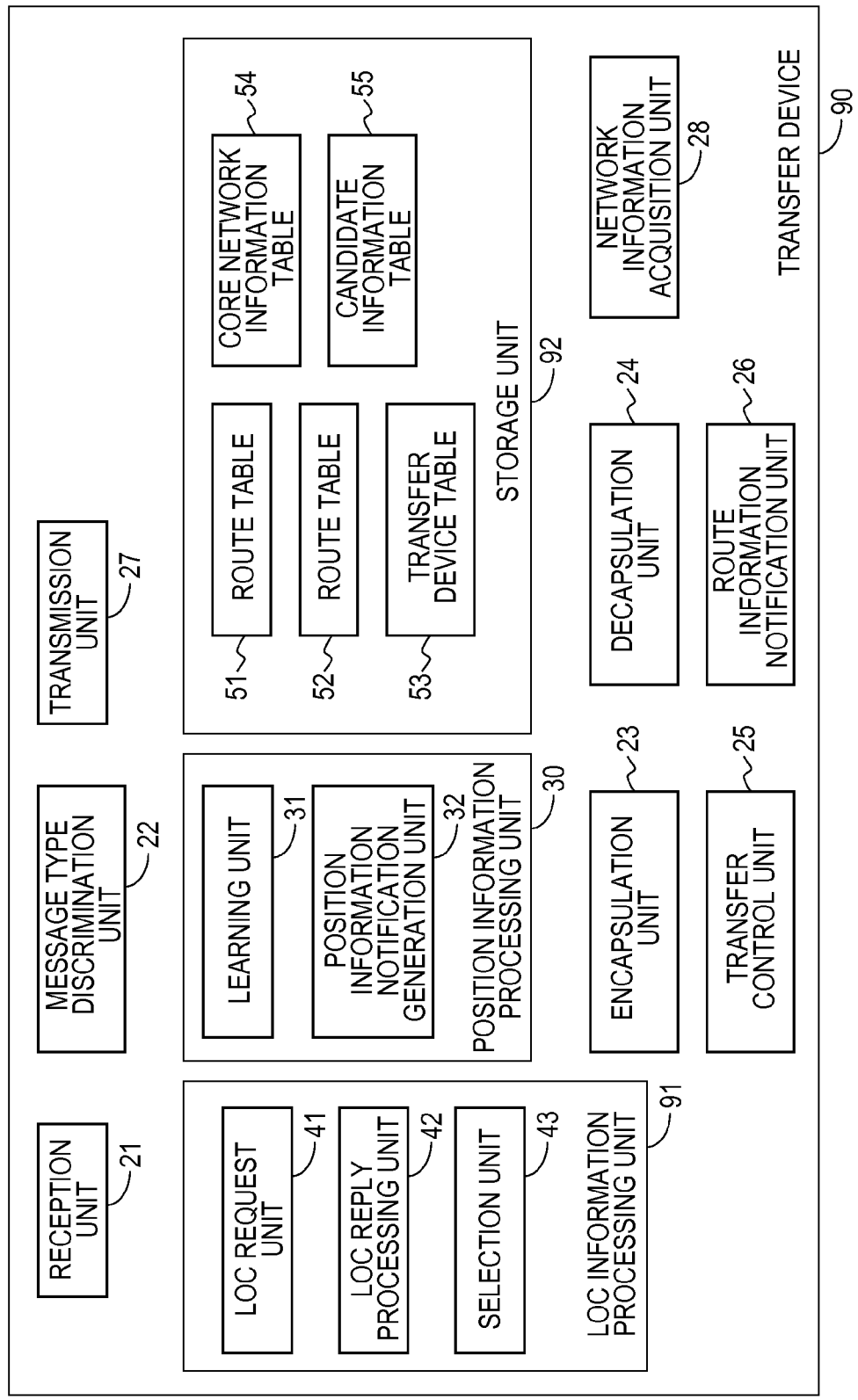
FIG. 16 is a diagram illustrating a configuration example of a transfer device, according to a third embodiment.

FIG. 16 is a diagram illustrating a configuration example of a transfer device, according to a third embodiment. The transfer device 90 includes a network information acquisition unit 28, a LOC information processing unit 91, and a storage unit 92, and further includes a reception unit 21, a message type discrimination unit 22, an encapsulation unit 23, a decapsulation unit 24, a transfer control unit 25, a route information notification unit 26, a transmission unit 27, and a position information processing unit 30. The LOC information processing unit 91 includes a LOC request unit 41, a LOC reply processing unit 42, and a selection unit 43. The storage unit 92 includes a core network information table 54 and a candidate information table 55, and further stores a route table 51, a route table 52, and a transfer device table 53. It is assumed that the transfer device 90 is configured as a hardware configuration similar to that of the transfer device 20. Here, the network information acquisition unit 28 and the LOC information processing unit 91 are implemented by using the processor 61, and the storage unit 92 is implemented by using the storage device 63.

Upon receiving an egress edge node address from the LOC reply processing unit 42, the selection unit 43 selects, as an ingress edge node, an edge node coupled to the egress edge node via a route whose condition for transferring an encapsulated packet 7 to the egress edge node is relatively favorable. The selection unit 43 is able to use the core network information table 54 and the candidate information table 55, on a timely basis, when performing calculation of routes from candidates for an ingress edge node to the egress edge node and when performing comparison of conditions of the respective routes.

The network information acquisition unit 28 is configured to acquire information such as topology, a bandwidth of each link, and a congestion state in the core network 3 through processing similar to that of the acquisition unit 17 which is included in the location management server 10. The network information acquisition unit 28 stores the acquired information on the core network 3 in the core network information table 54.

In a case where multi-home connection is performed, the candidate information table 55 holds information on transfer devices that are candidates for an ingress edge node and are included in the access network to which the transfer device 90 belongs. Here, it is assumed that the candidate information table 55 is configured to include both of information of the transfer device 20 and information of the transfer device 90. For example, it is assumed that the access network A1 and the core network 3 are connected with each other via a transfer device 90a and a transfer device 20c. In this case, information of the transfer device 90a and information of the transfer device 20c are stored in the candidate information table 55 that is held by the transfer device 90a included in the access network A1. It is assumed that the transfer device 90 is configured to store, in the candidate information table 55, information of transfer devices other than the transfer device 90 so as to reduce storage capacity used for the candidate information table 55. For example, as depicted in FIG. 17A, the information of the transfer device 20c that is a transfer device other than the transfer device 90a may be recorded in the candidate information table 55 of the transfer device 90a and the information of the transfer device 90a may be omitted.

An example of processing performed in the third embodiment is described with reference to FIGS. 17A and 17B. In examples according to the third embodiment, it is assumed that positions of the communication devices 1, the routers 4, and the transfer devices 20b and 20c and addresses assigned to these devices are similar to those of the first and second embodiments. In the example of FIGS. 17A and 17B, it is assumed that the transfer device 90a is set on a default route and the transfer device 90a connects the access network A1 and the ISP1. Further, it is assumed that an address assigned to the transfer device 90a is LOC1.

Figure 17A:
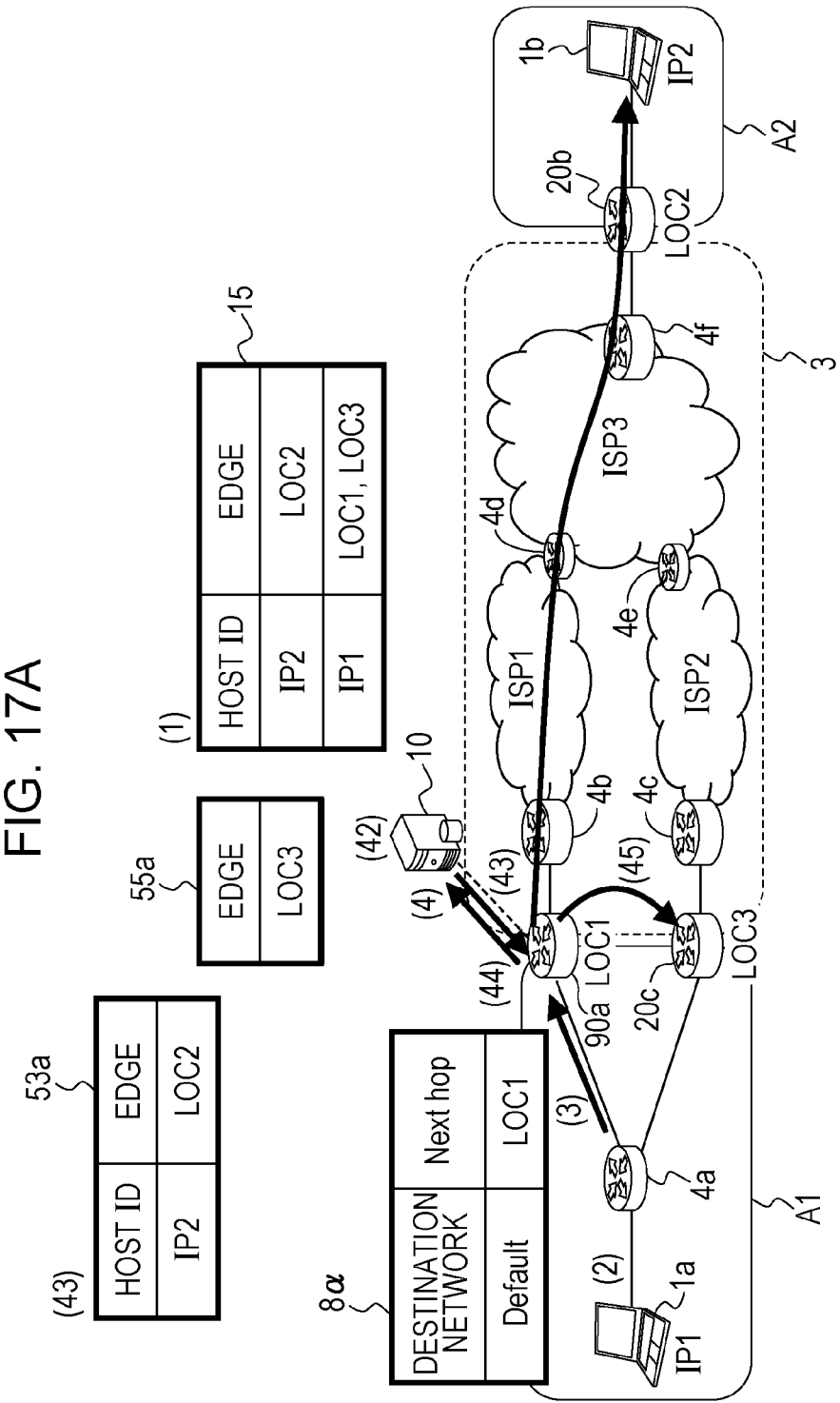
FIGS. 17A and 17B are diagrams illustrating an example of a communication method, according to a third embodiment.
Figure 17B:
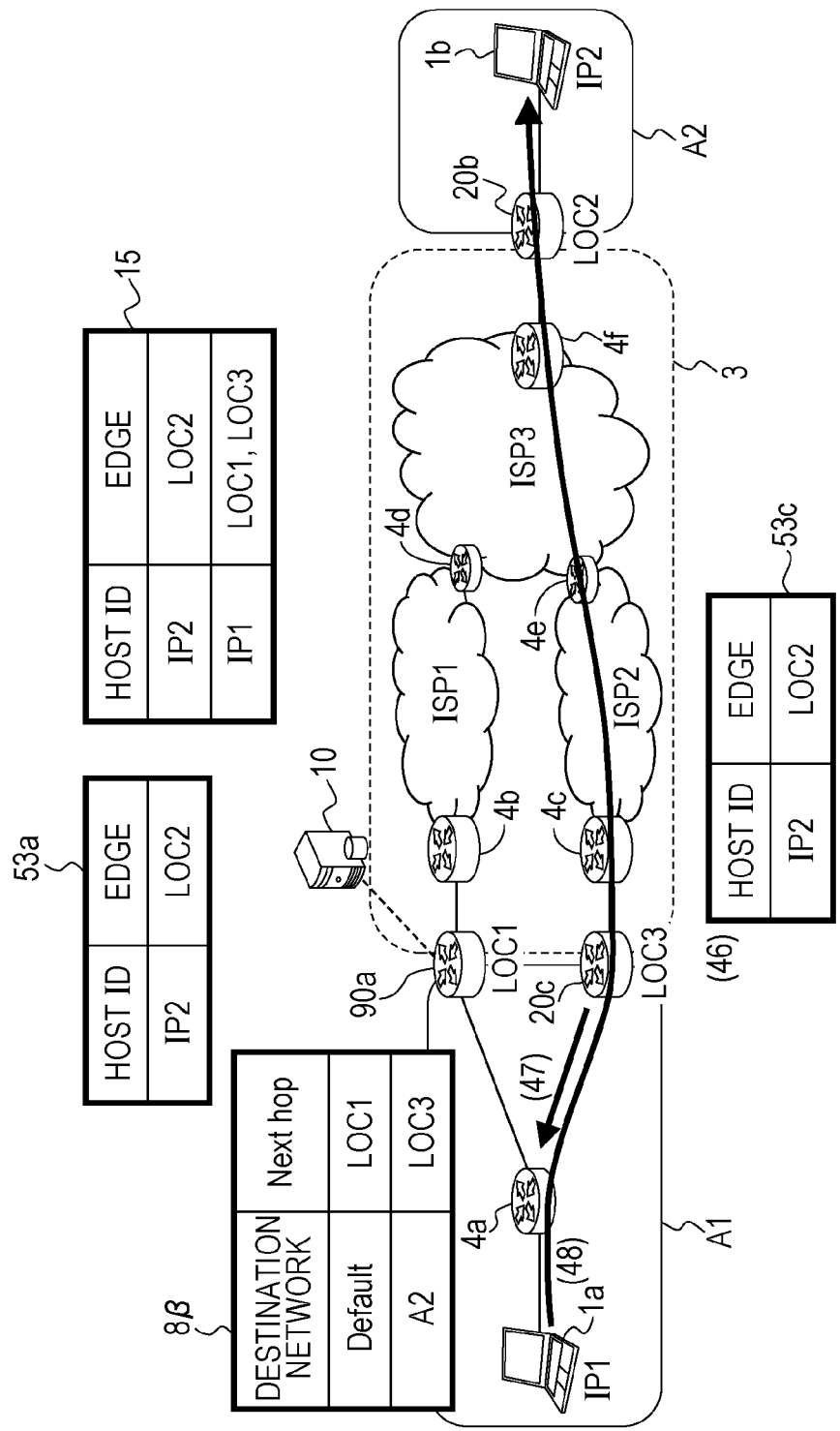

In the description of FIGS. 17A and 17B, when an operation in the transfer device 90a is described, "a" is appended to a tail end of reference characters. For example, the LOC reply processing unit 42 included in the transfer device 90a is denoted as the LOC reply processing unit 42a. Numbers in parentheses in FIGS. 17A and 17B indicate procedures which will be described below.

(41) When a packet addressed to the communication device 1b is transmitted from the communication device 1a, a LOC request message is transmitted from the transfer device 90a to the location management server 10 through processing similar to the procedures (1) to (4). In FIG. 17A, for ease of explanation, the numbers (1) to (4) of the procedures which have been used in the description of FIG. 9A are used instead of the number (41).

(42) The LOC request processing unit 14 of the location management server 10 that has received the LOC request message searches the position information management table 15 by using the address of the communication device 1b as a key, so as to determine a transfer device 20 associated with the communication device 1b. In the example of FIG. 17A, LOC2 is determined as an address of the egress edge node. Therefore, the LOC request processing unit 14 generates a LOC reply message whose destination is a transmission source of the LOC request message, where the LOC reply message includes the following information elements:

Destination address: LOC1
Transmission source address: Address of location management server 10
Type: LOC reply
Address of communication device serving as a destination: IP2
Address of egress edge node: LOC2
Address of ingress edge node: –

In the LOC reply message generated here, information on the ingress edge node is not set or an invalid value is set for it. The LOC request processing unit 14 transmits the generated LOC reply message to the transfer device 90a via the transmission unit 12.

(43) Upon receiving the LOC reply message, the transfer device 90a updates the transfer device table 53a and transmits the encapsulated packet 7 including the packet 6 to the transfer device 20b. Updating of the transfer device table 53a is performed in a manner similar to the procedure (23) which has been described with reference to FIG. 14A. Transmission of the encapsulated packet 7 is performed in a manner similar to the procedure (25) which has been described with reference to FIG. 14A.

(44) The LOC reply processing unit 42a outputs an address of the egress edge node to the selection unit 43a. The selection unit 43a obtains routes from transfer devices recorded in the candidate information table 55a and the transfer device 90a to the egress edge node and compares information on the respective routes. The selection unit 43a selects, as the ingress edge node, a transfer device positioned at a start point of a route whose state is favorable.

In the example of FIG. 17A, information (LOC3) on the transfer device 20c is recorded in the candidate information table 55a where the egress edge node is the transfer device 20b with an address of LOC2. Then, the selection unit 43a calculates a first route from the transfer device 90a to the transfer device 20b and a second route from the transfer device 20c to the transfer device 20b. Further, the selection unit 43a obtains the respective states of the first and second routes and compares the obtained states. Here, it is assumed that the selection unit 43a is able to use information stored in the core network information table 54a on a timely basis. It is also assumed that a state of the second route is more favorable than that of the first route in this example. Then, the selection unit 43a selects the transfer device 20c as the ingress edge node.

(45) When the selection unit 43a selects, as an ingress edge node, a transfer device other than the transfer device 90a, the selection unit 43a outputs the address of the selected ingress edge node to the LOC reply processing unit 42a. The LOC reply processing unit 42a sets the address notified from the selection unit 43a as a destination address of the LOC reply message that has been received in the procedure (43) and outputs the LOC reply message to the transmission unit 27a. The transmission unit 27a transmits the LOC reply message inputted from the LOC reply processing unit 42a. Accordingly, the LOC reply message is transmitted to the transfer device 20c in the example of FIG. 17A.

(46) The LOC reply message received by the transfer device 20c is used for updating the transfer device table 53c through processing similar to the procedure (23). The updated transfer device table 53c is depicted in FIG. 17B.

(47) The LOC reply processing unit 42c outputs the information determined from the LOC reply message to the route information notification unit 26c. The route information notification unit 26c generates a LOC information notification message and transmits the LOC information notification message to routers 4 and transfer devices 20 in the access network A1 via the transmission unit 27c. The LOC information notification message includes the following information elements:

Destination address: Router 4 and transfer device 20 in access network A1

Transmission source address: LOC3

Destination network address: Network address of access network A2

Upon receiving the LOC information notification message from the transfer device 20c, router 4a updates the routing table from the routing table 8α to the routing table 8β by recording the route to the access network A2.

(48) Processing for a case where the packet 6b addressed to the communication device 1b is transmitted from the communication device 1a after transmission of the packet 6a is similar to the procedures (10) to (12) which have been described with reference to FIG. 10.

Figure 18:
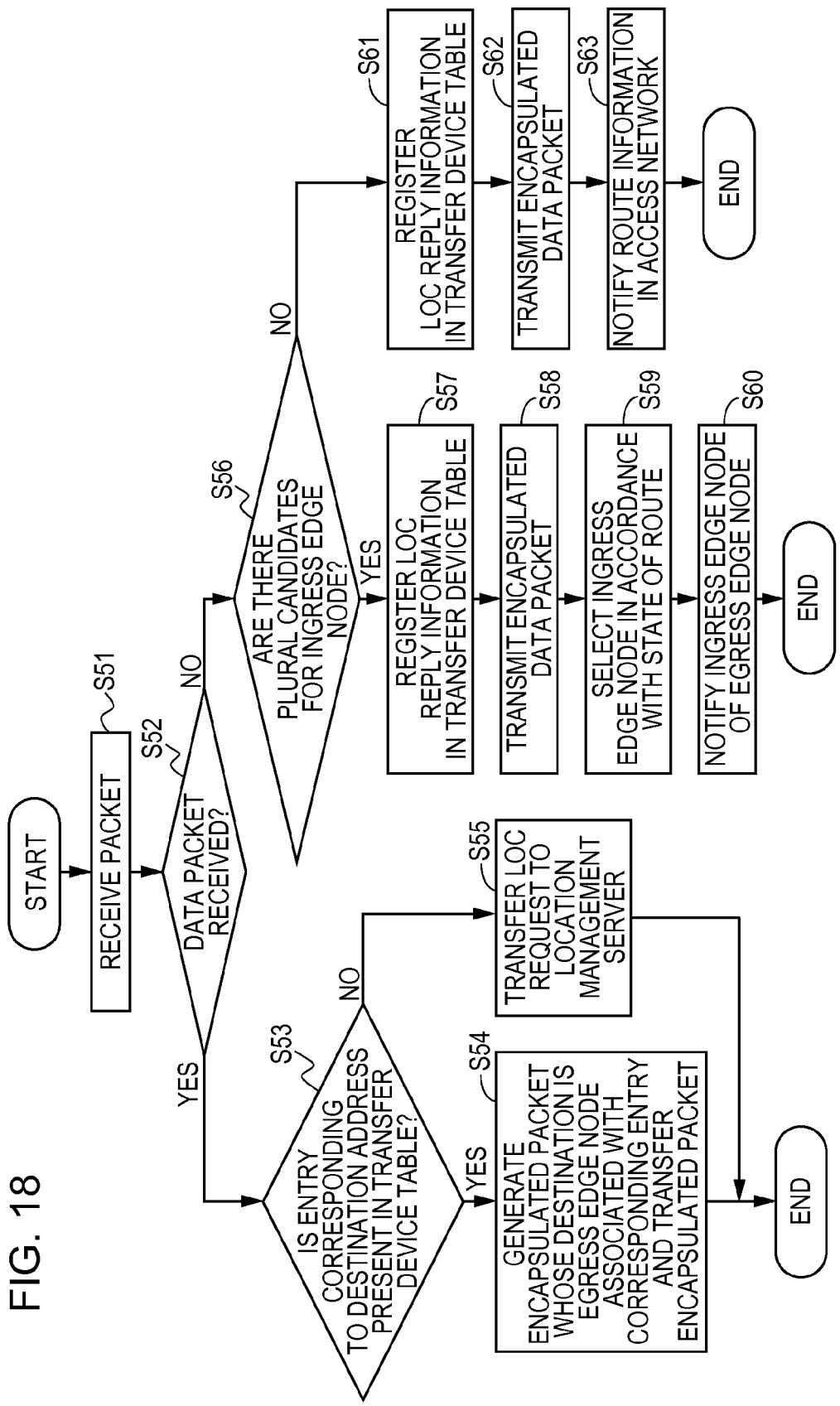
FIG. 18 is a diagram illustrating an example of an operational flowchart of a transfer device that is set as a transfer destination of a default route, according to a third embodiment.

FIG. 18 is a diagram illustrating an example of an operational flowchart of a transfer device that is set as a transfer destination of a default route, according to a third embodiment. An operation of the transfer device 90 in the case where the LOC reply processing unit 42 is able to refer to the candidate information table 55 is described below. FIG. 18 illustrates an example of an operation for a case where the transfer device 90 receives a packet from the access network side or the location management server 10. In FIG. 18, orders of steps S57 and S58 may be arbitrarily changed. Further, step S59 may be performed before steps S57 and S58. Processing performed in steps S51 to S55 is similar to that of steps S1 to S5 which has been described with reference to FIG. 12.

When a received packet is not data packet (No in step S52), the message type discrimination unit 22 determines that the received packet is a LOC reply message and outputs the packet to the LOC reply processing unit 42. The LOC reply processing unit 42 refers to the candidate information table 55 and determines whether or not plural candidates for an ingress edge node are present in the access network in which the node including the LOC reply processing unit 42 is positioned (step S56). When plural candidates for an ingress edge node are present (Yes in step S56), the LOC reply processing unit 42 notifies the selection unit 43 of information included in the LOC reply message and records the information in the transfer device table 53 (step S57). Further, the LOC reply processing unit 42 notifies the encapsulation unit 23 of the information included in the LOC reply message. In a case where the encapsulation unit 23 holds the packet 6 (data packet), the encapsulation unit 23 encapsulates the packet 6 on the basis of the notified information. The encapsulated packet is transmitted to the egress edge node (step S58). The selection unit 43 calculates routes from the respective candidates for an ingress edge node to the egress edge node and selects the ingress edge node depending on the states of the obtained routes (step S59). The selection unit 43 notifies the selected ingress edge node of information on the egress edge node (step S60).

On the other hand, when the node including the LOC reply processing unit 42 is the only candidate for an ingress edge node (No in step S56), the LOC reply processing unit 42 notifies the route information notification unit 26 of the information included in the LOC reply message and records the information in the transfer device table 53 (step S61). Further, the LOC reply processing unit 42 notifies the encapsulation unit 23 of the information included in the LOC reply message. When the encapsulation unit 23 holds the packet 6 (a data packet), the encapsulation unit 23 encapsulates the packet 6 on the basis of the notified information. The encapsulated packet is transmitted to the egress edge node (step S62). The route information notification unit 26 transmits a LOC information notification message including the information notified from the LOC reply processing unit 42 to routers 4 and transfer devices 20 in the access network (step S63).

Here, in the third embodiment, the location management server 10 does not have to include the selection unit 16, the acquisition unit 17, and the core network information table 18. Further, the location management server 10 does not have to perform calculation of routes, thereby reducing a load imposed on the location management server 10.

Fourth Embodiment

An example of processing performed in a fourth embodiment is described with reference to FIG. 19. In examples of the fourth embodiment, positions of the communication devices 1, the routers 4, and the transfer devices 20 and addresses assigned to these devices are similar to those of the first and second embodiments. Numbers in parentheses in FIG. 19 indicate procedures which will be described below.

(51) When a packet addressed to the communication device 1b is transmitted from the communication device 1a, a LOC request message is transmitted to the location management server 10 through processing similar to the procedures (1) to (4). In FIG. 19, for ease of explanation, the numbers (1) to (4) of the procedures which have been used in the description of FIG. 9A are used instead of (51).

(52) Upon receiving the LOC request message, the LOC request processing unit 14 of the location management server 10 searches the position information management table 15 for candidates for an ingress edge node and an egress edge node. In the case, since the LOC request processing unit 14 refers to the position information management table 15 depicted in FIG. 19, LOC2 associated with the address (IP2) of the communication device 1b serving as a destination becomes an address of the egress edge node. Further, the LOC request processing unit 14 sets LOC1 and LOC3 that are associated with the address (IP1) of the communication device 1a serving as a transmission source, as addresses assigned to the transfer devices 20 that are candidates for an ingress edge node.

(53) The LOC request processing unit 14 generates a LOC reply message for notifying information on the egress edge node where the LOC reply message is addressed to all the transfer devices 20 obtained as candidates for an ingress edge node. Here, in the LOC reply message generated here, information of the ingress edge node is not set or an invalid value is set. For example, the LOC reply message includes the following information elements:

Destination address: LOC1 or LOC3
Transmission source address: Address of location management server 10
Type: LOC reply
Address of communication device serving as a destination: IP2
Address of egress edge node: LOC2
Address of ingress edge node: –

The LOC request processing unit 14 transmits the generated LOC reply message to both the transfer device 20a and the transfer device 20c via the transmission unit 12.

Figure 19:
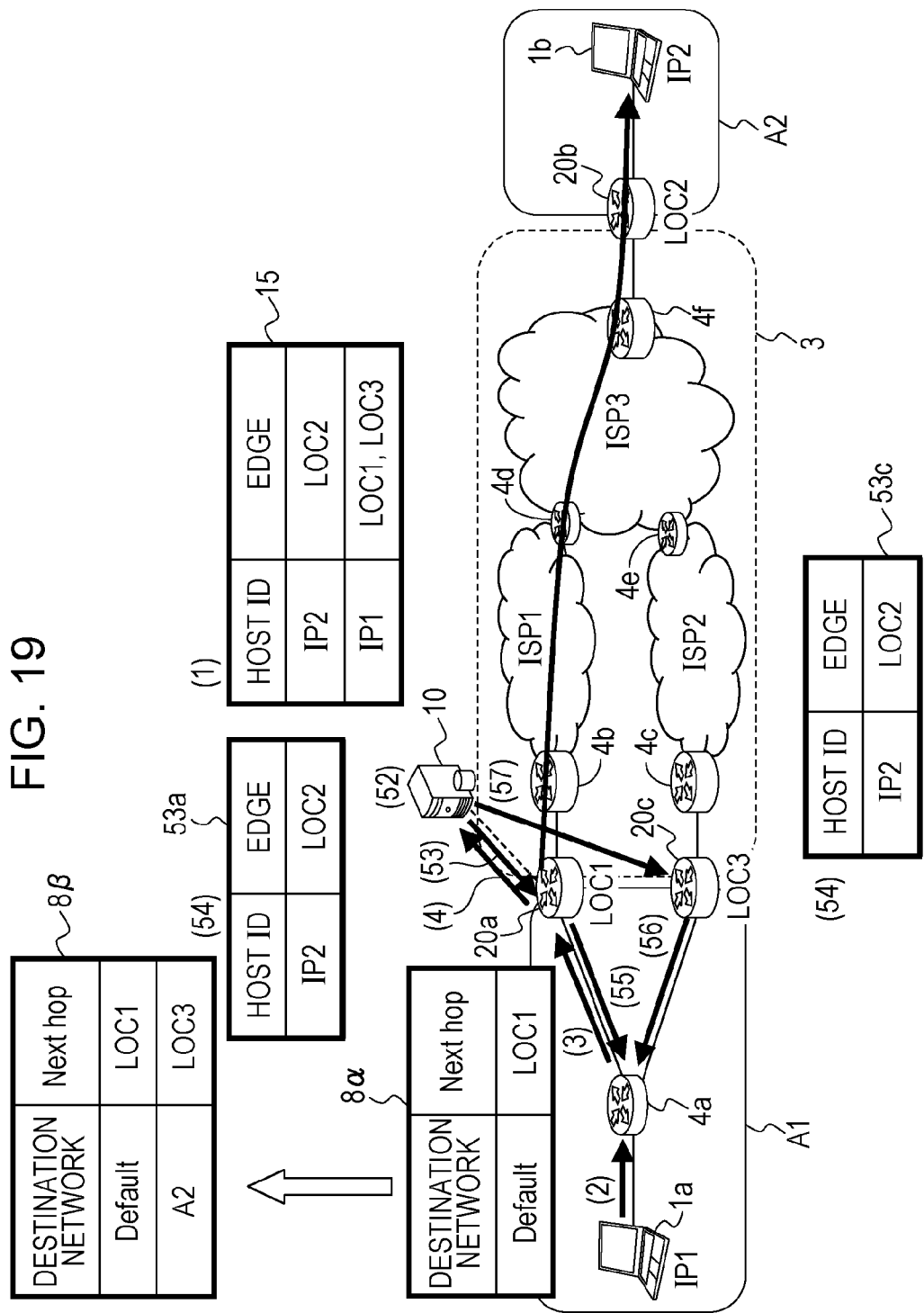
FIG. 19 is a diagram illustrating an example of a communication method, according to a fourth embodiment.

(54) The LOC reply message is processed in both of the transfer device 20a and the transfer device 20c, and the transfer device table 53a and the transfer device table 53c are updated as illustrated in FIG. 19. Processing performed in updating the transfer device tables 53 is similar to the procedure (7).

(55) The LOC reply processing unit 42a outputs the information determined from the LOC reply message to the route information notification unit 26a. The route information notification unit 26a generates a LOC information notification message by using the information inputted from the LOC reply processing unit 42a, where the LOC information notification message includes the following information elements:

Destination address: Router 4 and transfer device 20 in access network A1
Transmission source address: LOC1
Destination network address: Network address of access network A2

(56) The transfer device 20c also performs transmission of a LOC information notification message in a manner similar to that of the transfer device 20a. An operation performed at this time is similar to the procedure (8). Since the router 4a acquires pieces of route information associated with the same destination in the procedures (55) and (56), the router 4a records, in the routing table 8, the route information identifying a route whose state is more favorable than that of the other route. In this case, it is assumed that the state of a route passing through the transfer device 20c is relatively favorable. Then, the router 4a update the routing table 8 from the routing table 8α to the routing table 8β by recording the route from the transfer device 20c to the access network A2, as illustrated in FIG. 19.

(57) The LOC reply processing unit 42a of the transfer device 20a also outputs the information which is used for updating of the transfer device table 53a to the encapsulation unit 23a. The encapsulation unit 23a encapsulates the packet 6 by using the information notified from the LOC reply processing unit 42a so as to generate an encapsulated packet 7 and output the encapsulated packet 7 to the transfer control unit 25a. The transfer control unit 25a determines a transmission destination by using the route table 52a and transmits the encapsulated packet 7 via the transmission unit 27. Thereafter, the encapsulated packet 7 is processed by the transfer device 20b in a manner similar to the procedure (12) which has been described with reference to FIGS. 9A and 9B. As a result, the communication device 1b receives the packet 6a.

(58) Thereafter, when a packet 6b addressed to the communication device 1b is transmitted from the communication device 1a subsequently to the packet 6, the router 4a selects one of the transfer devices 20a and 20c that is coupled to the egress edge node via a route whose state is more favorable, as a transfer destination of the packet 6b. Processing for the case where the transfer device 20c is selected as the transfer destination is similar to the procedures (10) to (12) which have been described with reference to FIG. 10.

Figure 20:
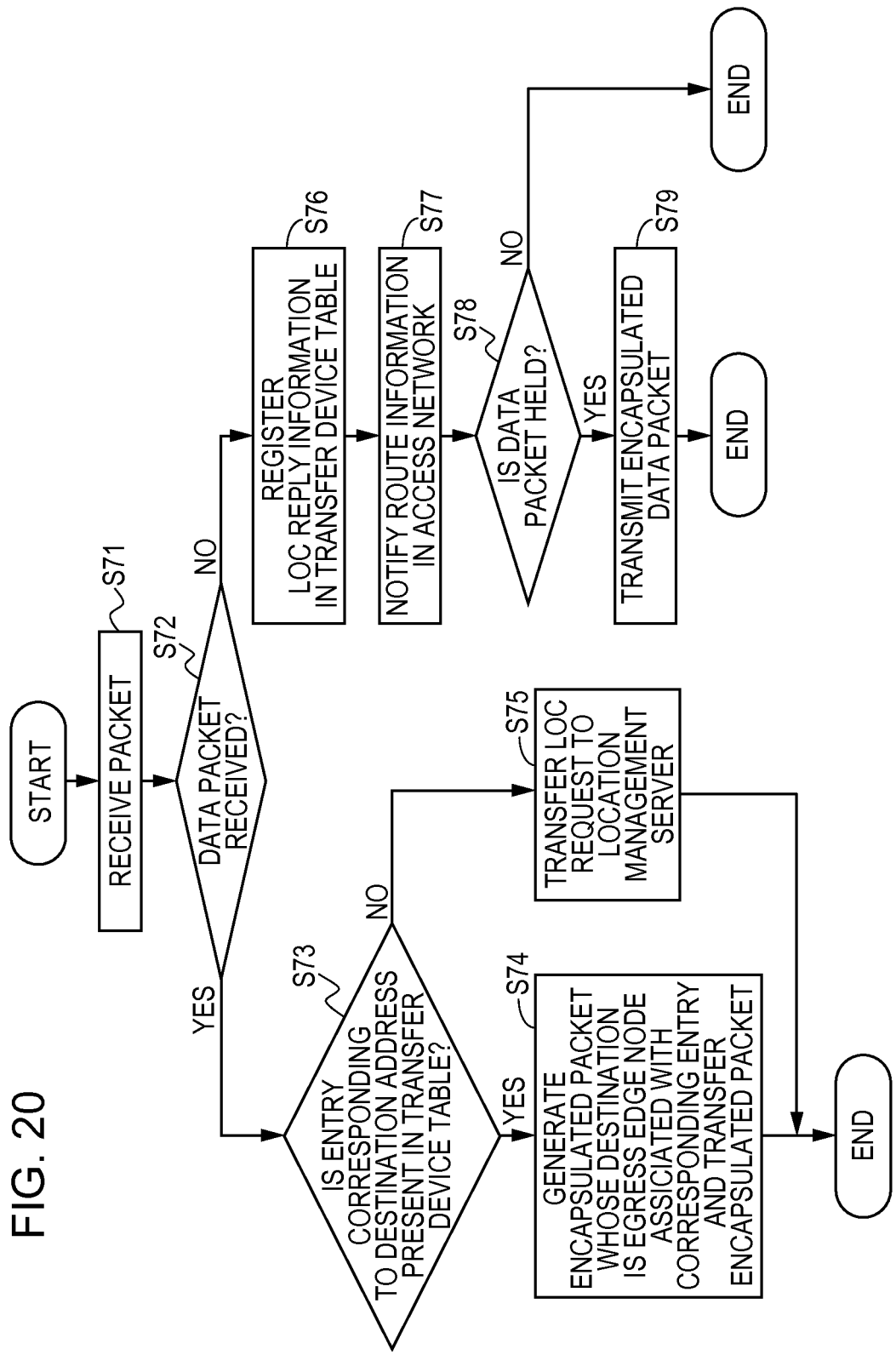
FIG. 20 is a diagram illustrating an example of an operational flowchart performed by a transfer device, according to a fourth embodiment.

FIG. 20 is a diagram illustrating an example of an operational flowchart performed by a transfer device, according to a fourth embodiment. FIG. 20 illustrates an example of processing when the transfer device 20 receives a packet from a device in the access network or the location management server 10. Here, FIG. 20 is an example and orders of steps S76 and S77 may be changed. Processing performed in steps S71 to S75 is similar to that of steps S1 to S5 which have been described with reference to FIG. 12.

When a received packet is not a data packet (No in step S72), the message type discrimination unit 22 outputs the received packet to the LOC reply processing unit 42. The LOC reply processing unit 42 notifies the route information notification unit 26 of information included in the LOC reply message and records the information in the transfer device table 53 (step S76). The route information notification unit 26 transmits a LOC information notification message including the information notified from the LOC reply processing unit 42 to routers 4 and transfer devices 20 which are included in the access network (step S77). Subsequently, the LOC reply processing unit 42 notifies the encapsulation unit 23 of the information included in the LOC reply message. When the encapsulation unit 23 holds the packet 6 (Yes in step S78), the encapsulation unit 23 encapsulates the packet 6 on the basis of the notified information and transmits the encapsulated packet to the egress edge node (step S79). When the encapsulation unit 23 does not hold the packet 6 (No in step S78), the encapsulation unit 23 ends the processing.

Figure 21:
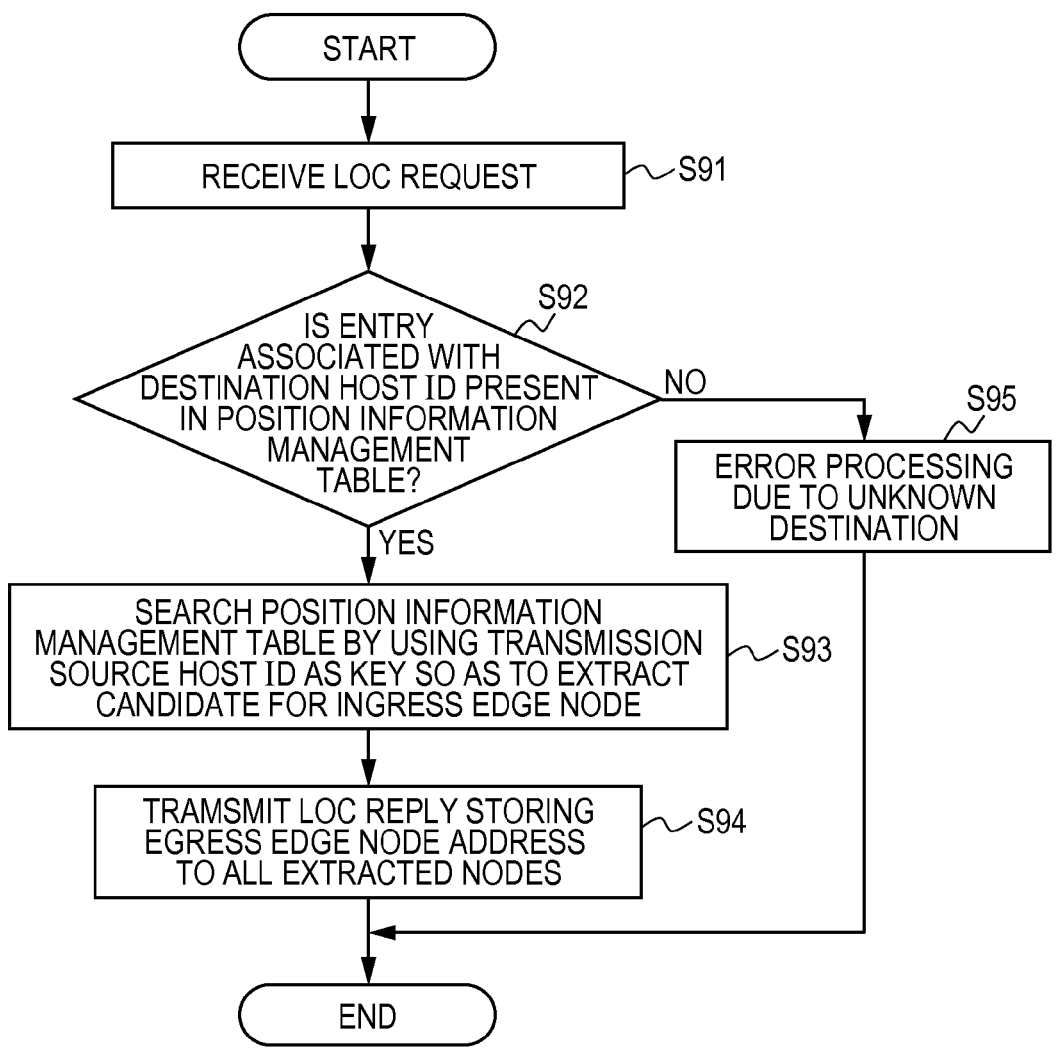
FIG. 21 is a diagram illustrating an example of an operational flowchart performed by a location management server, according to a fourth embodiment.

FIG. 21 is a diagram illustrating an example of an operational flowchart performed by a location management server, according to a fourth embodiment. Processing of steps S91 to S93 and S95 is similar to that of steps S21 to S23 and S28 which have been described with reference to FIG. 13. The location management server 10 transmits a LOC reply message in which an address of the egress edge node associated with an address of the communication device 1 serving as a destination, to all the transfer devices 20 which are extracted in step S93 (step S94).

Further, in procedure (55) of FIG. 19, the transfer device 20a may notify the inside of the access network A1 of a LOC information notification message including information indicating a distance such as the number of hops from the transfer device 20a to the transfer device 20b. In a similar manner, in procedure (56) of FIG. 19, the transfer device 20c may also notify the inside of the access network A1 of a LOC information notification message including information indicating a distance of a route from the transfer device 20c to the transfer device 20b. The router 4a records, in the routing table, information on one of the transfer devices 20a and 20c accommodating a route whose distance included in the LOC information notification message is shorter than that of the other route, as a transmission destination. In this case, the router 4a may decide a transmission destination depending on a state of the core network 3.

In the fourth embodiment, the location management server 10 does not have to include the selection unit 16, the acquisition unit 17, and the core network information table 18, as is the case with the third embodiment. Further, the location management server 10 does not have to perform calculation of routes, reducing a load imposed on the location management server 10. In the fourth embodiment, a transfer device which is set on a default route does not calculate routes other than a route from the transfer device to an egress edge node. Thus, the transfer device does not have to calculate a plurality of routes. Therefore, a load imposed on the transfer device included in the default route is smaller than that of the third embodiment.

Others

Embodiments are not limited to the above described embodiments, and various modifications may be made. Examples of the modifications will be described below.

In the third embodiment, when an ingress edge node is not a transfer device 90 that is on a default route, the transfer device 90 that is on the default route may pretend to be the transfer device 20 selected as the ingress edge node and transmit a LOC information notification message. In this case, a generating method of a LOC information notification message is similar to that of the second embodiment.

The transfer device 20 and the transfer device 90 may store, for each host ID, information in association with acquisition time of the information in the transfer device table 53. In this case, the route information notification unit 26 may monitor a time period that has elapsed from a time point of acquisition of each piece of information, and delete the information when a predetermined time period has elapsed from a time point of the acquisition of the information. The route information notification unit 26 may transmit a LOC information deletion notification message to transfer devices 20 and routers 4 in an access network so as to request deletion of route information corresponding to an address recorded in the deleted entry. For example, information elements included in a LOC information deletion notification message are similar to those of a LOC information notification message, and a message type is "deletion notification". Upon receiving the LOC information deletion notification message, a router 4 deletes an entry corresponding to the information included in the LOC information deletion notification message from the routing table 8. Further, the transfer device 20 deletes an entry corresponding to the information included in the received LOC information deletion notification message from the route table 51. Here, when transfer devices 20 and 90 on a default route transmit a LOC information notification message by pretending to be other transfer devices, the transfer devices 20 and 90 on the default route also transmit a LOC information deletion notification message by pretending to be other transfer devices. Therefore, when the transfer devices 20 and 90 on the default route pretend to be other transfer devices and transmit a LOC information notification message, information on the transfer devices to be pretended is stored in the transfer device table 53.

The case where an edge node that is not on a default route is a transfer device 20 has been described as an example in the third embodiment, but all edge nodes may be transfer devices 90. Further, the transfer device 90 may be used in the first, second, and fourth embodiments as well.

The case where the access network A1 is multi-home-connected by two transfer devices 20 and 90 has been described as an example. However, even if multi-home connection is performed by three or more transfer devices 20 and 90, the communication according to all embodiments including the first to fourth embodiments is applicable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for transferring a packet, the method comprising:
   requesting, by a first of transfer devices, a location management server to provide first information identifying a second of the transfer devices in a second network when the first of the transfer devices in a first network receives a packet addressed to a second communication device in the second network from a first communication device in the first network, the second of the transfer devices being operable to transfer the packet to the second communication device in the second network, the location management server managing positions of the first communication device and the second communication device;
   notifying, by the location management server, at least one of the transfer devices in the first network of the first information; and
   transferring the packet by a third of the transfer devices to the second of the transfer devices, after the at least one of the transfer devices in the first network have been notified of second information identifying a third of the transfer devices that is included in the first network and that is coupled to the second of the transfer devices, via a route having a communication state more favorable than a communication state of the at least one of the transfer devices in the first network, the transferring of the packet being via a communication tunnel coupling the third of the transfer devices and the second of the transfer devices that serve as an ingress edge node and an egress edge node of the communication tunnel, respectively.

2. The method of claim 1, further comprising:
   acquiring, by the location management server, third information indicating a state of a third network positioned between the first network and the second network,
   comparing, by the location management server, a state of a first route from the first of the transfer devices to the second of the transfer devices with a state of a second route from a fourth of the transfer devices in the first network to the second of the transfer devices, based on the third information, and
   determining, by the location management server, the fourth of the transfer devices to be the third of the transfer devices serving as the ingress edge node of the communication tunnel when a state of the second route is more favorable than a state of the first route.

3. The method of claim 1, further comprising:
   notifying, by the location management server, the third of the transfer devices of third information identifying the second of the transfer devices;
   transmitting, by the third of the transfer devices, route information including fourth information indicating that the packet is transferrable from the third of the transfer devices, to a fourth of the transfer devices on a route from the first communication device to the first of the transfer devices in the first network; and determining, by the fourth transfer devices, the third transfer devices as a transfer destination of the packet in the first network.

4. The method of claim 1, further comprising:

notifying, by the location management server, the first transfer of the devices of the first information and information indicating that the third transfer of the devices is the ingress edge node of the communication tunnel;

transmitting, by the first of the transfer devices, route information to a fourth of the transfer devices on a route from the first communication device to the first of the transfer devices in the first network, the route information including third information indicating that the third of the transfer devices is designated as the ingress edge node of the communication tunnel and the packet is transferrable from the third of the transfer devices; and determining, by the fourth of the transfer devices, the third of the transfer devices to be a transfer destination of the packet in the first network.

5. The method of claim 1, further comprising:

notifying, by the location management server, the first of the transfer devices of the first information; and acquiring, by the first of the transfer devices, third information indicating a state of a third network positioned between the first network and the second network;

comparing, by the first of the transfer devices, a state of a first route from the first of the transfer devices to the second transfer devices with a state of a second route from a fifth transfer of the devices in the first network to the second of the transfer devices, based on the third information, and determining, by the first of the transfer devices, the fifth of the transfer devices to be the third of the transfer devices serving as the ingress edge node of the communication tunnel when a state of the second route is more favorable than a state of the first route.

6. The method of claim 5, further comprising:

notifying, by the first of the transfer devices, the third of the transfer devices of fourth information indicating that the third of the transfer devices is the ingress edge node of the communication tunnel;

transmitting, by the third of the transfer devices, route information including fifth information indicating that the packet is transferrable from the third of the transfer devices, to a fourth of the transfer devices on a route from the first communication device to the first of the transfer devices in the first network; and determining, by the fourth of the transfer devices, the third of the transfer devices to be a transfer destination of the packet in the first network.

7. The method of claim 5, further comprising:

transmitting, by the first of the transfer devices, route information including fourth information indicating that the third of the transfer devices is designated as the ingress edge node of the communication tunnel and the packet is transferrable from the third of the transfer devices, to a fourth transfer device on a route from the first communication device to the first of the transfer devices in the first network; and determining, by the fourth of the transfer devices, the third of the transfer devices to be a transfer destination of the packet in the first network.

8. The method of claim 1, further comprising:

notifying, by the location management server, the first of the transfer devices and a fourth transfer devices in the first network of the first information;

transmitting, by the first transfer devices, first route information including information indicating that the packet is transferrable from the first of the transfer devices, to a fifth of the transfer devices on a route from the first communication device to the first of the transfer devices in the first network;

transmitting, by the fourth of the transfer devices, second route information including information indicating that the packet is transferrable from the fourth transfer device, to the fifth of the transfer devices; and determining, by the fifth of the transfer devices, one of the first transfer devices and the fourth of the transfer devices to be the third of the transfer devices serving as the ingress edge node of the communication tunnel and determining the third of the transfer devices to be a transfer destination of the packet in the first network.

9. The method of claim 8, further comprising:

acquiring, by the first of the transfer devices, third information indicating a state of a third network positioned between the first network and the second network;

incorporating, by the first of the transfer devices, information indicating a state of a route from the first of the transfer devices to the second of the transfer devices, into the first route information, based on the third information;

acquiring, by the third of the transfer devices, the third information; and incorporating, by the third of the transfer devices, information indicating a state of a route from the third of the transfer devices to the second of the transfer devices, into the second route information, based on the third information, wherein the fifth transfer device determines one of the first of the transfer devices and the fourth of the transfer devices that has transmitted information on a route whose state is relatively favorable, to be the third of the transfer devices serving as the ingress edge node of the communication runnel, by comparing the first route information with the second route information.

10. An apparatus for transferring a packet, the apparatus comprising:

an interface circuit configured to receive, from a first communication device in a first network, a packet addressed to a second communication device in a second network; and a processor configured to:

generate a request message for requesting a location management server to provide first information identifying a first transfer device in the second network, the first transfer device being operable to transfer the packet to the second communication device, the location management server managing positions of the first communication device and the second communication device, acquire the first information and second information identifying a second transfer device in the first network by processing a reply message that is transmitted from the location management server in response to the request message, the second transfer device being coupled to the first transfer device via a route having a communication state more favorable than a communication state of transfer devices in the first network, and generate a notification message indicating that the packet is transferrable to the second communication device via the second transfer device, wherein the interface circuit transmits the request message to the location management server and transmits the notification message to the transfer devices in the first network.

11. An apparatus for transfer a packet, the apparatus comprising:
an interface circuit configured to receive, from a first communication device in a first network, a packet addressed to a second communication device in a second network; and
a processor configured to:
generate a request message for requesting a location management server to provide first information identifying a first transfer device in the second network, the first transfer device being operable to transfer the packet to the second communication device, the location management server managing positions of the first communication device and the second communication device,
recognize the first information and second information indicating that tunnel communication from second and third transfer devices in the first network to the first transfer device in the second network is possible, by processing a reply message that is transmitted from the location management server in response to the request message,
acquire third information on a third network positioned between the first network and the second network,
compare a state of a first route from the second transfer device to the first transfer device with a state of a second route from the third transfer device to the first transfer device, based on the third information,
select the third transfer device when a state of the second route is determined to provide a more favorable communication than provided by a state of the first route,
generate a notification message indicating that the packet is transferrable to the second communication device via the third transfer device, wherein the processor transmits the request message to the location management server and transmits the notification message to transfer devices in the first network.

12. An apparatus comprising:
a memory configured to store position information indicating that a first communication device is positioned in a first network and a second communication device is positioned in a second network; and
a processor configured to:
receive, from a first transfer device positioned in the first network, a request message for requesting information identifying a second transfer device operable to transfer a data packet, addressed to the second communication device, to the second communication device in the second network,
select, from among transfer devices in the first network, a third transfer device coupled to the second transfer device via a route having a communication state that is more favorable than communication states of the transfer devices in the first network, based on position information, and
generate a reply message including information on the second transfer device and the third transfer device, in response to the request message, and
transmit the reply message.

* * * * *